(12) United States Patent
Uenomachi

(10) Patent No.: US 10,753,457 B2
(45) Date of Patent: Aug. 25, 2020

(54) OPERATING DEVICE AND VEHICULAR SHIFT DEVICE USING OPERATING DEVICE

(71) Applicant: ALPS ALPINE CO., LTD., Tokyo (JP)

(72) Inventor: Takashi Uenomachi, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 183 days.

(21) Appl. No.: 16/053,021

(22) Filed: Aug. 2, 2018

(65) Prior Publication Data

US 2018/0340607 A1    Nov. 29, 2018

Related U.S. Application Data

(63) Continuation of application No. PCT/JP2017/003798, filed on Feb. 2, 2017.

(30) Foreign Application Priority Data

Feb. 10, 2016 (JP) .................................. 2016-023417

(51) Int. Cl.
| | |
|---|---|
| *F16H 59/02* | (2006.01) |
| *B60K 20/02* | (2006.01) |
| *G05G 1/04* | (2006.01) |
| *G05G 5/03* | (2008.04) |
| *F16H 61/02* | (2006.01) |
| *G05G 5/05* | (2006.01) |
| *G05G 9/047* | (2006.01) |

(52) U.S. Cl.
CPC ......... *F16H 59/0204* (2013.01); *B60K 20/02* (2013.01); *F16H 61/0204* (2013.01);
(Continued)

(58) Field of Classification Search
CPC ............ G05G 9/047; G05G 1/04; G05G 5/03; G05G 5/05; F16H 59/0204;
(Continued)

(56) References Cited

U.S. PATENT DOCUMENTS 6,923,083 B2    8/2005 Fujinuma
7,219,572 B2 *  5/2007 Syamoto ............. F16H 59/0204
                                                        74/335
(Continued)

FOREIGN PATENT DOCUMENTS

EP    1615250    1/2006
EP    2891835    7/2015
(Continued)

OTHER PUBLICATIONS

International Search Report dated Apr. 25, 2017 in PCT/JP2017/003798 filed on Feb. 2, 2017.
(Continued)

*Primary Examiner* — Randell J Krug
(74) *Attorney, Agent, or Firm* — IPUSA, PLLC

(57) ABSTRACT

An operating device includes a tiltable operating member, a support supporting the operating member, a first movable member and a second movable member configured to move together with the operating member, a first magnetic body provided on the first movable member, a second magnetic body provided on a second movable member, and a permanent magnet supported by the support. When the operating member is in a reference position, the permanent magnet and the first and second magnetic bodies attract each other. When the operating member is tilted in a first direction from the reference position to be positioned in multiple positions, first, the first magnetic body moves away from the permanent magnet with the tilting of the first movable member, and next, the second magnetic body moves away from the permanent magnet with the tilting of the second movable member.

16 Claims, 20 Drawing Sheets

(52) U.S. Cl.
CPC ................. *G05G 1/04* (2013.01); *G05G 5/03* (2013.01); *G05G 5/05* (2013.01); *F16H 2059/0247* (2013.01); *F16H 2059/0295* (2013.01); *G05G 9/047* (2013.01)

(58) Field of Classification Search
CPC ......... F16H 2059/0295; F16H 61/0204; F16H 2059/0247; B60K 20/02
See application file for complete search history.

(56) References Cited

U.S. PATENT DOCUMENTS

2017/0009876 A1\* 1/2017 Uenomachi .............. H01H 5/02
2019/0285170 A1\* 9/2019 Igarashi .............. F16H 59/0204

FOREIGN PATENT DOCUMENTS

| EP | 2902665 | 8/2015 |
|---|---|---|
| EP | 3115648 | 1/2017 |
| JP | 2002-144905 | 5/2002 |
| JP | 2015-140022 | 8/2015 |
| JP | 2015-143910 | 8/2015 |
| JP | 2015-149058 | 8/2015 |

OTHER PUBLICATIONS

Extended European Search Report for 17750153.3 dated Mar. 4, 2019.

\* cited by examiner

FIG.11A
FIG.11B
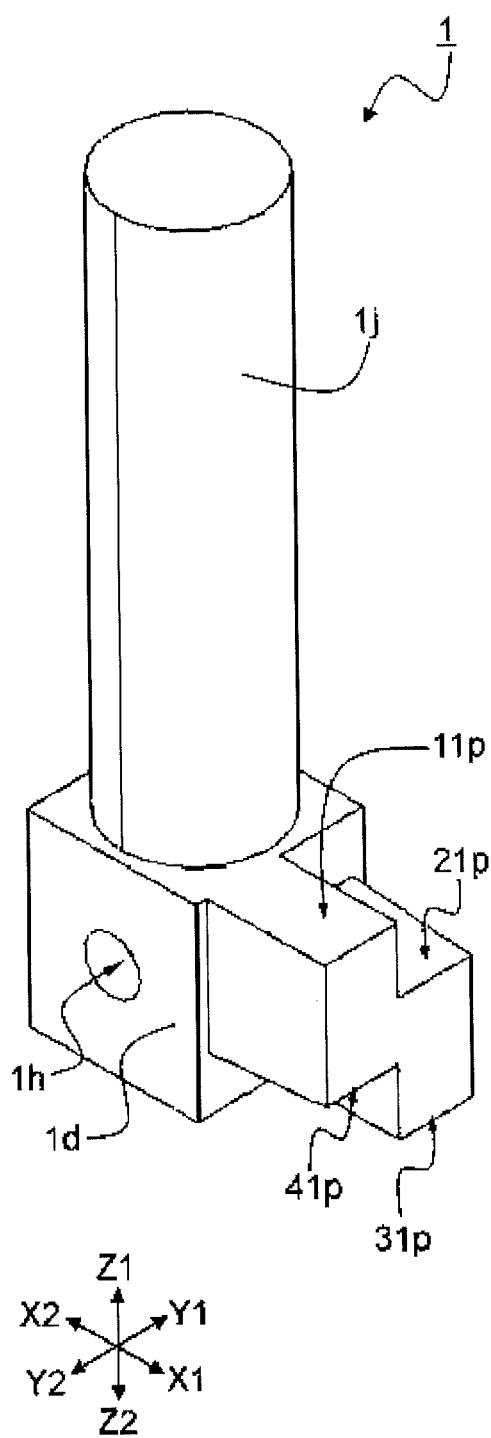
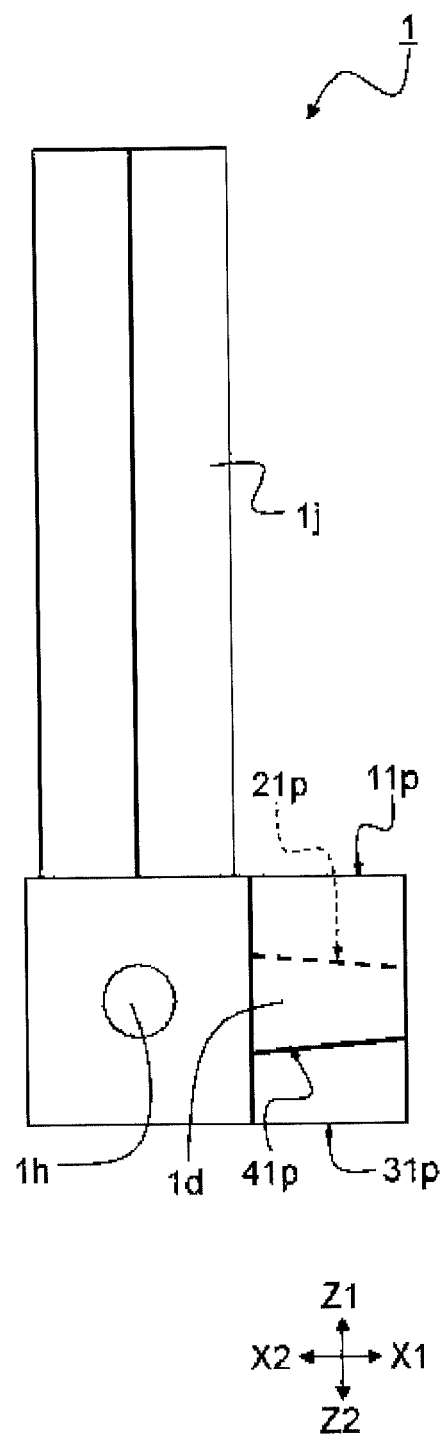

OPERATING DEVICE AND VEHICULAR SHIFT DEVICE USING OPERATING DEVICE

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2017/003798, filed on Feb. 2, 2017 and designating the U.S., which claims priority to Japanese Patent Application No. 2016-023417, filed on Feb. 10, 2016. The entire contents of the foregoing applications are incorporated herein by reference.

BACKGROUND OF THE INVENTION

1. Field of the Invention

The present invention relates to operating devices and vehicular shift devices using the same.

2. Description of the Related Art

In general, operating bodies configured to be tilted to perform operations are widely used for remote controllers of various electronic devices such as televisions and video devices, input devices of game machines, vehicular operating devices, etc. In particular, input devices of game machines, vehicular operating devices, etc., employ a type of operating device in which an operating body is gripped to be tilted. With respect to vehicular operating devices, etc., there has been a demand for a sense of moderation for a better operational feeling in the case of tilting an operating body to perform switching.

As an operating device with this sense of moderation, Japanese Laid-open Patent Publication No. 2002-144905 (conventional example) proposes an automatic transmission shift operating device 900 as illustrated in FIG. 20. FIG. 20 is an enlarged longitudinal sectional view of the automatic transmission shift operating device 900 of the conventional example with a shift lever 901 in an N range (neutral range).

The automatic transmission shift operating device 900 illustrated in FIG. 20 includes the pivotable shift lever 901 to which a knob 902 is fixed, a pivotable holder 903 fixed to the shift lever 901, a first shaft 905 and a second shaft (not depicted) orthogonal to the first shaft 905, which enable the pivoting of the shift lever 901, and a case 904 supporting the first shaft 905 and the second shaft so that the first shaft 905 and the second shaft are pivotable.

As illustrated in FIG. 20, according to the automatic transmission shift operating device 900, the shift lever 901 can pivot to each of the positions of a P range (parking range), an R range (reverse range), the N range (neutral range), and a D range (drive range) with the first shaft 905 serving as a pivot shaft. The shift lever 901 is supported at each of the positions (P range, R range, N range, and D range) or the shift lever 901 is automatically returned, using a moderating spring 909 and a moderating body 910 that are provided in a lower body part 903c of the holder 903 and moderating grooves 904A formed at the inside bottom of the case 904. Specifically, as illustrated in FIG. 20, the moderating grooves 904A includes a first moderating groove 904b that supports the shift lever 901 in the P range, a second moderating groove 904c that supports the shift lever 901 in the R range, a third moderating groove 904d that supports the shift lever 901 in the N range, and a fourth moderating groove 904e that supports the shift lever 901 in the D range, which are formed in a front-ear direction. The moderating body 910 is urged by the moderating spring 909 to slide on these moderating grooves 904A.

According to the automatic transmission shift operating device 900 thus configured, the shift lever 901 is configured to be provided with a sense of moderation when the moderating body 910 moves along the moderating grooves 904A (904b, 904c, 904d, and 904e) provided in correspondence to the positions (P range, R range, N range, and D range).

SUMMARY OF THE INVENTION

According to an aspect of the present invention, an operating device includes an operating member configured to tilt in response to an operation of an operator, the operating member being configured to be positioned in a plurality of positions of the operating device in response to being tilted from a reference position by the operator, a support supporting the operating member so that the operating member is tiltable, a first movable member and a second movable member configured to tilt in conjunction with the operating member, and a first magnetic body provided on the first movable member, a second magnetic body provided on the second movable member, and a permanent magnet supported by the support. When the operating member is in the reference position, the first magnetic body and the second magnetic body are placed in proximity to each other on one side of the permanent magnet, and the permanent magnet and the first and second magnetic bodies attract each other. When the operating member is tilted in one of first directions from the reference position to be positioned in one or more of the plurality of positions, first, the first magnetic body moves away from the permanent magnet with tilting of the first movable member, and next, the second magnetic body moves away from the permanent magnet with tilting of the second movable member.

BRIEF DESCRIPTION OF THE DRAWINGS

FIG. 2A is a front view taken from the Y2 side shown in FIG. 1 and FIG. 2B is a side view taken from the X1 side shown in FIG. 1;

FIG. 4A is a plan view illustrating a shift layout of a vehicle and FIG. 4B is a plan view illustrating positions of a shift knob;

FIG. 8(a) is a front view taken from the Y2 side shown in FIG. 7 and FIG. 8(b) is a side view taken from the X1 side shown in FIG. 7;

FIG. 9A is a perspective view in which a first movable member and a first magnetic body shown in FIG. 7 are omitted and FIG. 9B is a perspective view in which a second movable member and a second magnetic body shown in FIG. 9A are omitted;

FIG. 10A is a perspective view in which a drive member and a permanent magnet shown in FIG. 9B are omitted and FIG. 10B is a perspective view in which a fourth movable member and a fourth magnetic body shown in FIG. 10A are omitted;

FIGS. 11A and 11B are diagrams illustrating an operating member of the operating device according to the first embodiment of the present invention, where FIG. 11A is a perspective view of the operating member and FIG. 11B is a front view of the operating member taken from the Y2 side of FIG. 11A;

FIG. 12A is an upper-side perspective view of the frame of the support 2 and FIG. 12B is a lower-side perspective view of the frame of the support;

FIG. 13A is a diagram of the state of a reference position, FIG. 13B is a diagram of the state of being tilted in one direction with respect to a first direction, and FIG. 13C is a diagram of the state of being further tilted in the one direction with respect to the first direction compared with FIG. 13B;

FIG. 14A is a diagram of the state of a reference position, FIG. 14B is a diagram of the state of being tilted in the other direction with respect to the first direction, and FIG. 14C is a diagram of the state of being further tilted in the other direction with respect to the first direction compared with FIG. 14B;

FIG. 16A is a diagram of the state where the operating member is in a second position, FIG. 16B is a diagram of the state where the operating member is between the second position and a first position, and FIG. 16C is a diagram of the state where the operating member is in the first position;

FIG. 18A is a side view of Variation 1 and Variation 2 and FIG. 18B is a side view of Variation 3 and Variation 4;

DETAILED DESCRIPTION OF THE PREFERRED EMBODIMENTS

Figure 1:
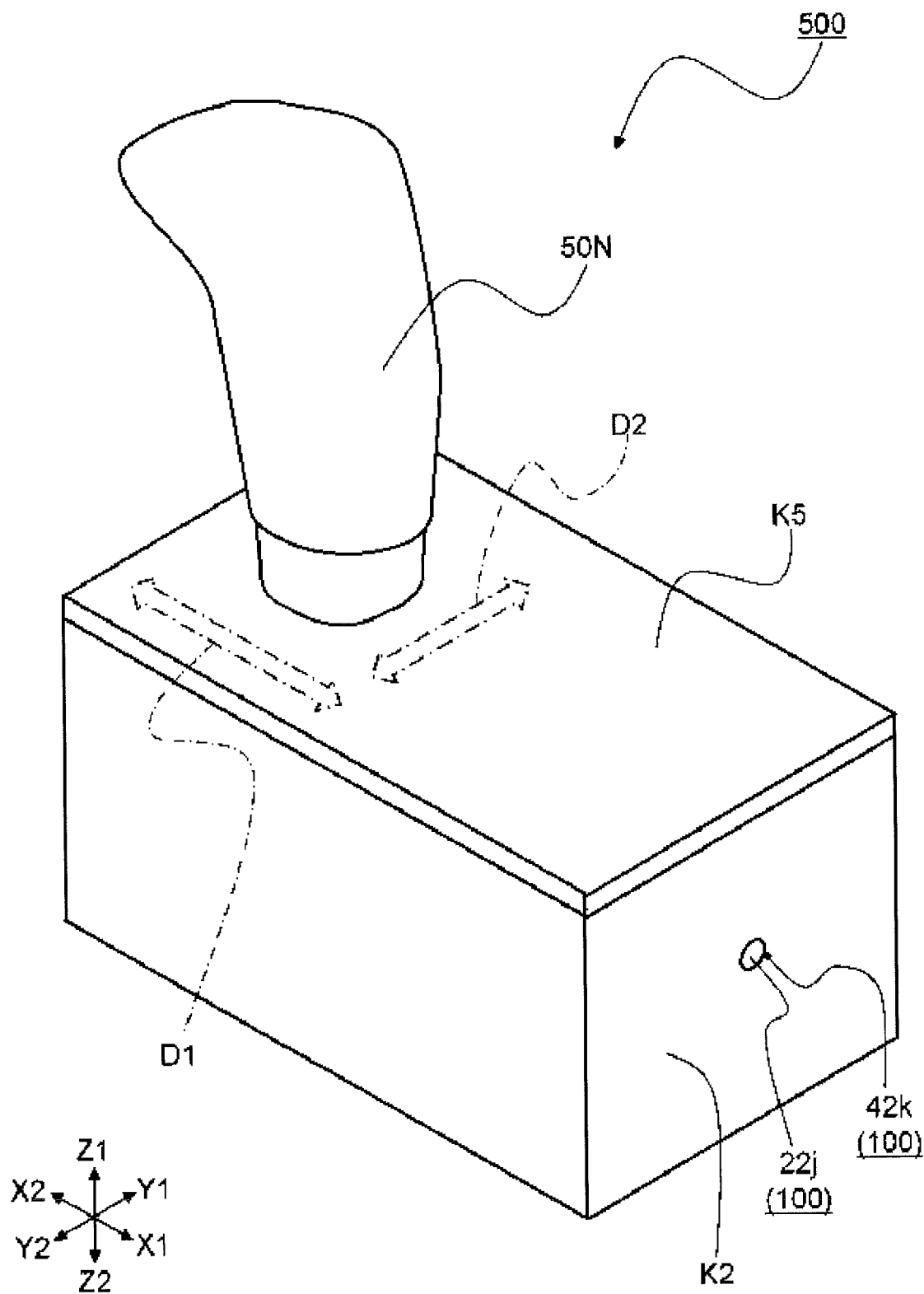
FIG. 1 is a perspective view illustrating a vehicle shift device using an operating device according to a first embodiment of the present invention.

The conventional example, however, uses a sliding mechanism that slides the moderating body 910 on the moderating grooves 904A to create this sense of moderation. Therefore, there is a problem in that repeated pivoting of the shift lever 901 results in the wear of the moderating grooves 904A and the moderating spring 909, the degradation of the springiness of the moderating spring 909, the backlash of the moderating spring 909 and the moderating body 910, etc., to lower the durability of the sliding mechanism.

According to an aspect of the present invention, an operating device with a sense of moderation and good durability and a vehicular shift device using the operating device are provided.

One or more embodiments of the present invention are described below with reference to the drawings.

First Embodiment

In a first embodiment of the present invention, an operating device 100 and a vehicular shift device 500 are described. First, the vehicular shift device 500 using the operating device 100 is described.

Figure 2A:
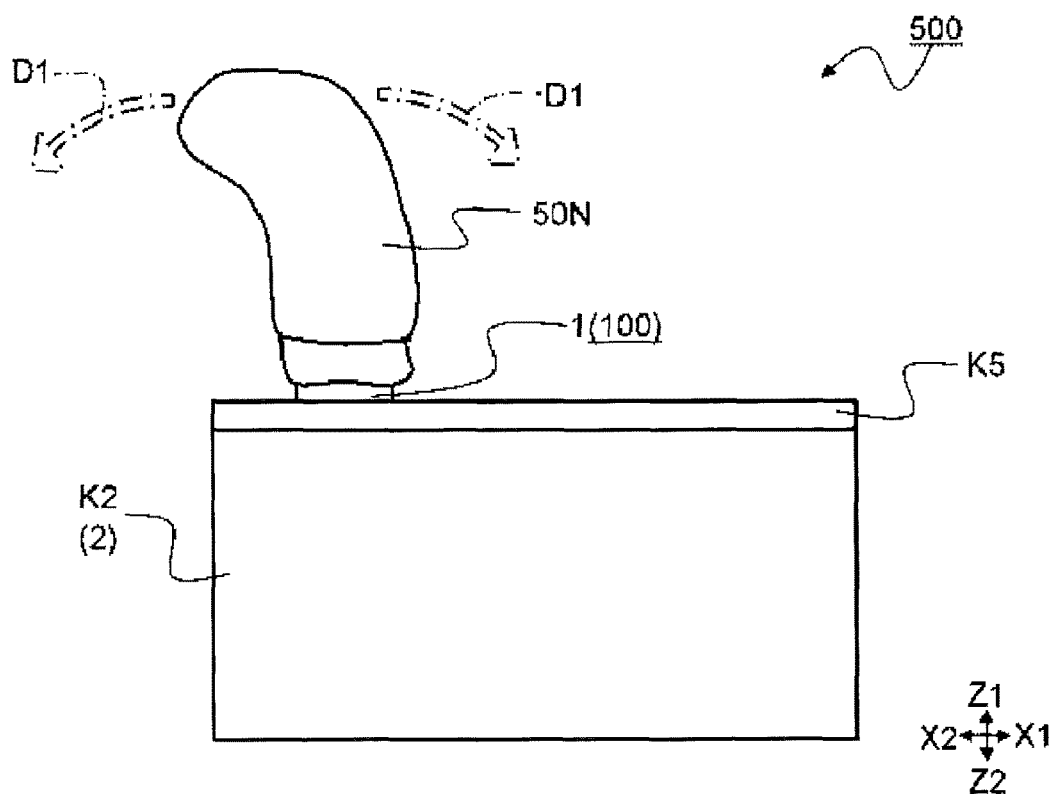
FIGS. 2A and 2B are diagrams illustrating the vehicular shift device using the operating device according to the first embodiment of the present invention, where
Figure 2B:
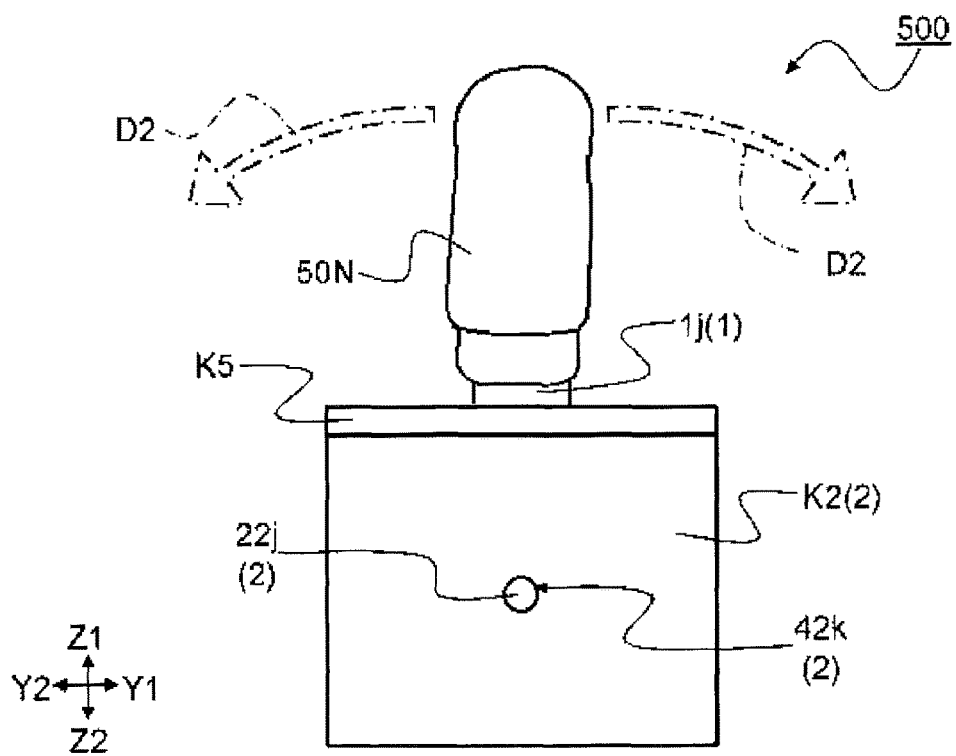
Figure 3:
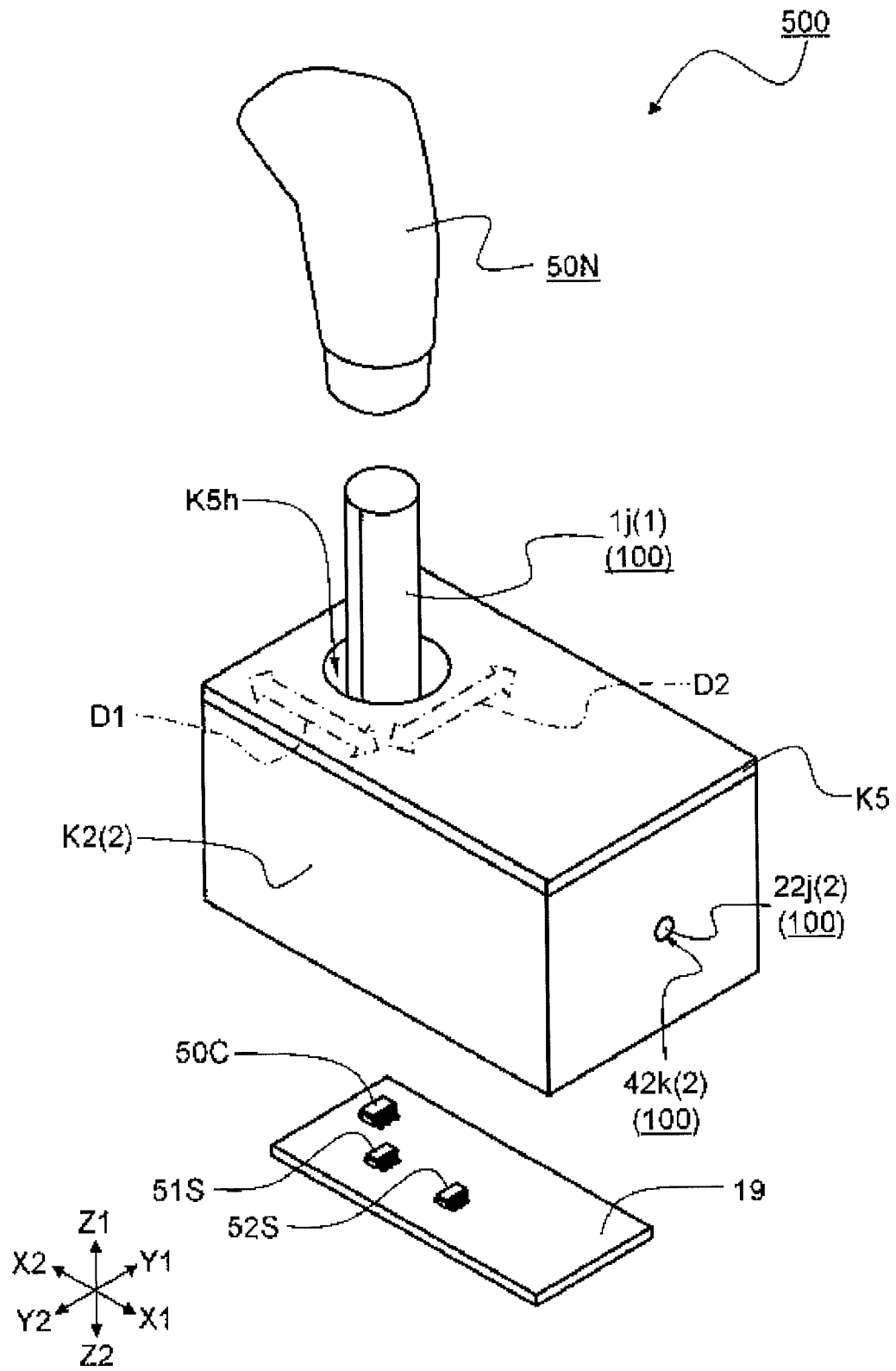
FIG. 3 is an exploded perspective view illustrating the vehicular shift device using the operating device according to the first embodiment of the present invention.

FIG. 1 is a perspective view illustrating the vehicular shift device 500 using the operating device 100 according to the first embodiment of the present invention. FIGS. 2A and 2B are diagrams illustrating the vehicular shift device 500 using the operating device 100 according to the first embodiment of the present invention, where FIG. 2A is a front view taken from the Y2 side shown in FIG. 1 and FIG. 2B is a side view taken from the X1 side shown in FIG. 1. FIG. 3 is an exploded perspective view illustrating the vehicular shift device 500 using the operating device 100 according to the first embodiment of the present invention.

The vehicular shift device 500 using the operating device 100 according to the first embodiment of the present invention has a box-like appearance as illustrated in FIGS. 1, 2A and 2B, and includes a shift knob 50N configured to be gripped by an operator, the operating device 100 operable in multiple directions in response to the tilting operation of the shift knob 50N by the operator, a control part 50C configured to transmit a signal to a vehicle-side device in response to receiving a signal from the operating device 100, and a position detecting part (not depicted) that detects multiple positions at which an operating member 1 of the operating device 100 is to be positioned, as illustrated in FIG. 3.

In addition, according to the first embodiment of the present invention, the vehicular shift device 500 includes a case K2 used as part of a below-described support 2 in the operating device 100 (fainting the exterior of the vehicular shift device 500), a cover K5 covering an upper open part of the case K2, and a wiring board 19 that is accommodated in the case K2 of the operating device 100 and on which the control part 50C is mounted, as illustrated in FIG. 3. This vehicular shift device 500 is mounted in a vehicle, and is used for shift operations of the vehicle capable of tilting in a front-rear first direction D1 (X directions shown in FIG. 1) and a left-right second direction D2 (Y directions shown in FIG. 1) crossing (in the first embodiment of the present invention, orthogonal to) the first direction D1.

First, the shift knob 50N of the vehicular shift device 500 has an elongated shape to be easily grippable by an operator as illustrated in FIGS. 1 through 3, and is provided in engagement with the operating member 1 of the operating device 100 to cover an operating shaft 1$j$ (see FIG. 3) of the operating member 1 as illustrated in FIGS. 1, 2A and 2B. The shift knob 50N is manufactured by injection molding, using a synthetic resin such as an ABS resin (ABS, acrylonitrile butadiene styrene copolymer).

Next, the control part 50C of the vehicular shift device 500 is formed using an integrated circuit (IC), and is mounted on the wiring board 19 (see FIG. 3) accommodated in the box-shaped case K2. The control part 50C is connected to a vehicle-side device through an undepicted connector, and transmits an operation position information signal to the vehicle-side device in response to a tilting operation of the shift knob 50N. In response to this position information signal, an action corresponding to a shift pattern is performed and the position of the shift knob 50N in the shift pattern is displayed on a display part provided in an instrument panel or the like on the vehicle side.

Next, although not depicted, the position detecting part of the vehicular shift device 500 uses so-called rotary variable resistors formed of a board on which a resistor pattern is formed and a wiper that slides over the resistance pattern, and includes a first position detector for detecting multiple positions in a tilting operation in the first direction D1 and a second position detector for detecting multiple positions in a tilting operation in the second direction D2. The first position detector and the second position detector are accommodated in the box-shaped case K2. As described below, the first position detector is engaged with a tilt shaft 12$e$ of the support 2 (a first tilt shaft; see FIG. 5 described below) to detect the rotation angle of the tilt shaft 12$e$, and the second position detector is engaged with a second tilt shaft 22$j$ of the support 2 (see FIG. 5 described below) to detect the rotation angle of the second tilt shaft 22$j$.

Furthermore, the position detecting part includes a first signal processing part 51S and a second signal processing part 52S that process respective signals from the first position detector and the second position detector, and the first signal processing part 51S and the second signal processing part 52S are mounted on the wiring board 19 as illustrated in FIG. 3. Furthermore, the first signal processing part 51S and the second signal processing part 52S are connected to the first position detector and the second position detector, respectively, through an undepicted flexible printed circuit (FPC). The first signal processing part 51S calculates the rotation angle of the tilt shaft 12$e$ based on a signal from the first position detector, and detects a movement of the operating member 1 in the first direction D1 from this rotation angle. Likewise, the second signal processing part 52S calculates the rotation angle of the second tilt shaft 22$j$ based on a signal from the second position detector, and detects a movement of the operating member 1 in the second direction D2 from this rotation angle.

Finally, the case K2, the cover K5, and the wiring board 19 of the vehicular shift device 500 are described.

First, the case K2 of the vehicular shift device 500, which is manufactured by injection molding of a synthetic resin material such as polybutylene terephthalate (PBT), has an opening that is open at the upper surface, and is formed into a rectangular box shape.

Furthermore, as FIG. 3 illustrates one side, bearing parts 42$k$ formed of circular through holes whose central axes coincide with each other are formed one in each of the wall portions of the case K2 that are opposite in a longitudinal direction (an X direction shown in FIG. 3). The second tilt shaft 22$j$ (see FIG. 5) of the below-described support 2 is inserted into each of the bearing parts 42$k$ (the other side is not depicted). These bearing parts 42$k$, together with the second tilt shaft 22$j$, form part of the support 2.

Next, the cover K5 of the vehicular shift device 500, which is manufactured by injection molding of a synthetic resin material such as polybutylene terephthalate (PBT) the same as the case K2, is formed into a plate shape and provided to cover the upper opening of the case K2 as illustrated in FIG. 3. Although not depicted in detail, the cover K5 is engaged with the case K2.

Furthermore, as illustrated in FIG. 3, a circular through hole K5$h$ is formed in a central portion of the cover K5. The operating shaft 1$j$ of the operating member 1 is inserted through this through hole K5$h$ to be exposed on the upper surface side of the cover K5. This makes it possible for the operating shaft 1$j$ of the operating member 1 of the operating device 100 to engage with the shift knob 50N of the vehicular shift device 500.

Finally, the wiring board 19 of the vehicular shift device 500 uses a common single-sided printed wiring board (PWB), on which the control part 50C, the first signal processing part 51S, and the second signal processing part 52S are mounted as described above (see FIG. 3). Furthermore, although not depicted, a flexible printed circuit (FPC) for electrically connecting the first signal processing part 51S to the first position detector and the second signal processing part 52S to the second position detector is connected to and a connector for external connection is mounted on the wiring board 19.

Figure 4A:
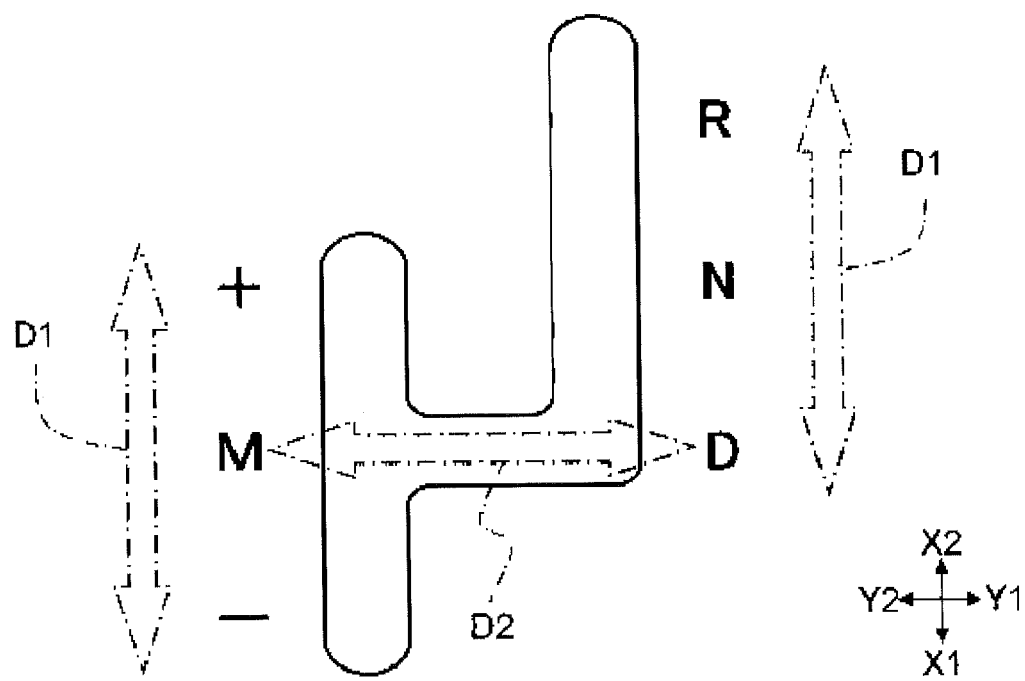
FIGS. 4A and 4B are diagrams specifically illustrating operations of the vehicular shift device using the operating device according to the first embodiment of the present invention, where
Figure 4B:
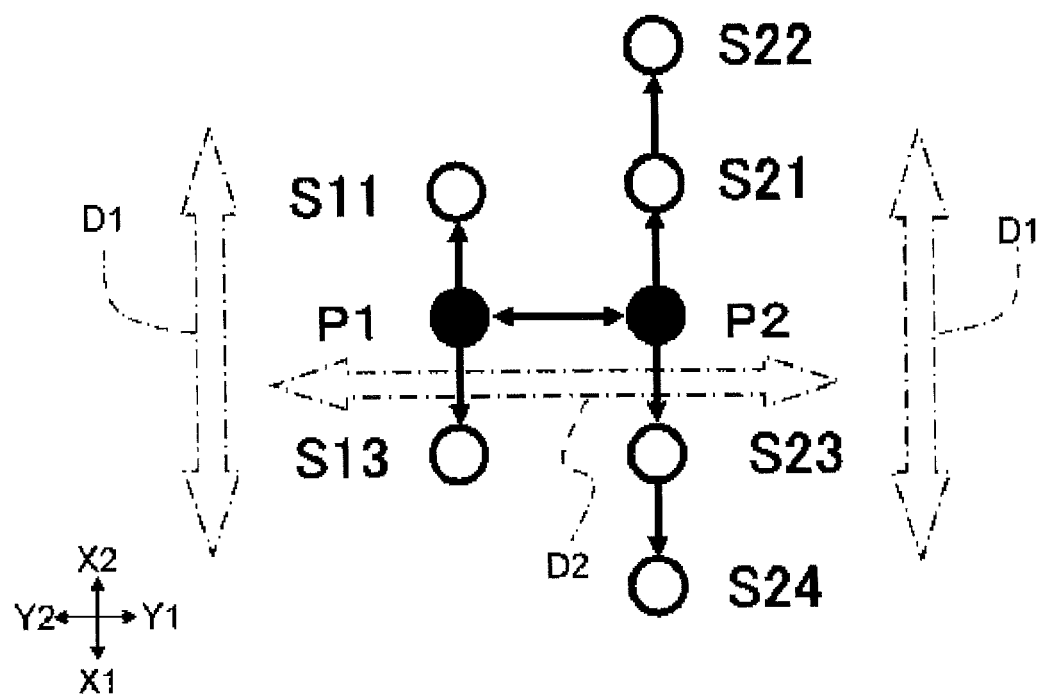

Here, shift operations of the vehicular shift device 500 using the operating device 100 according to the first embodiment of the present invention are specifically described using FIGS. 4A and 4B. FIGS. 4A and 4B are diagrams specifically illustrating operations of the vehicular shift device 500 using the operating device 100 according to the first embodiment of the present invention, where FIG. 4A is a plan view illustrating a shift layout (shift pattern) of a vehicle and FIG. 4B is a plan view illustrating positions of the shift knob 50N. The shift pattern illustrated in FIG. 4A is displayed on the above-described display part provided in an instrument panel or the like. Furthermore, the positions illustrated in FIG. 4B schematically illustrate positions to which the operating member 1 is shifted as a result of the shift knob 50N (the operating member 1) being operated. The shift pattern illustrated in FIG. 4A illustrates an example in the vehicular shift device 500 to which the operating device 100 is applied, and this shift pattern is not limiting.

The vehicular shift device 500 according to the first embodiment of the present invention is applied not to mechanically controlled vehicles in which the shift knob 50N is directly coupled to a transmission but to electronically controlled vehicles. Therefore, a shift operation of a vehicle is performed solely with an information signal of a shift position transmitted from the operating device 100. This shift position is shown in the shift pattern displayed on the above-described display part provided in an instrument panel or the like.

For example, in the case where the shift knob 50N (the operating member 1) is positioned in a second position P2 shown in FIG. 4B and the shift position is positioned in a neutral mode "N" shown in FIG. 4A, in response to the shift knob 50N being tilted in the X2 direction to a front first position S21 shown in FIG. 4B, an information signal indicating that the shift position is moved to a reverse mode "R" shown in FIG. 4A is transmitted to the vehicle side, so that a shift operation of the vehicle is performed. Then, because the operator releases the operator's hand from the shift knob 50N because of the completion of the operation, the shift knob 50N automatically returns to be back to the second position P2.

Furthermore, when the shift knob 50N positioned in the second position P2 is tilted in the X1 direction to be operated to a rear first position S23 and a rear second position S24 shown in FIG. 4B in order in the subsequent operation, the shift position in the reverse mode "R" moves to the neutral mode "N" and a drive mode "D" shown in FIG. 4A in order. In response to this operation, an information signal indicating that the shift position is moved to the drive mode "D" shown in FIG. 4A is transmitted to the vehicle side, so that a shift operation of the vehicle is performed. Then, because the operator releases the operator's hand from the shift knob 25 50N because of the completion of the operation, the shift knob 50N automatically returns to be back to the second position P2.

Thus, with respect to an automatic operation having the reverse mode "R," the neutral mode "N," and the drive mode "D," the vehicular shift device 500 uses an automatic operation position that is a reference position by assigning it to the second position P2 of the operating member 1 of the operating device 100. In this case, to switch from the reverse mode "R" to the drive mode "D," the operating member 1 of the operating device 100 is configured to be tiltable in two stages in the X1 direction, namely, to the rear first position S23 and the rear second position S24, as described above. Likewise, to switch from the drive mode "D" to the reverse mode "R," the operating member 1 of the operating device 100 is configured to be tiltable in two stages in the X2 direction, namely, to the front first position S21 and a front second position S22 shown in FIG. 4B. The movement directions (tilting directions) of the operating member 1 of the operating device 100 in the X directions are assigned to the first direction D1 of the shift operation of the vehicle.

For example, in the case where the shift position is in the drive mode "D" shown in FIG. 4A, when the shift knob 50N positioned in the second position P2 is tilted in the Y2 direction to a first position P1 of the operating member 1 shown in FIG. 4B, the shift position in the drive mode "D" moves to a manual mode "M" shown in FIG. 4A. In this case, even when the operator releases the operator's hand from the shift knob 50N, the operating member 1 (the shift knob 50N) remains in the first position P1 to be kept tilted as is.

Furthermore, when the shift knob 50N positioned in the first position P1 is tilted in the X2 direction to a front position S11 shown in FIG. 4B in the subsequent operation, an information signal indicating that the shift position is moved to a shift-up mode "+" shown in FIG. 4A is transmitted to the vehicle side, so that a shift-up operation of the vehicle is performed. Likewise, when the shift knob 50N positioned in the first position P1 is tilted in the X1 direction to a rear position S13 shown in FIG. 4B, an information signal indicating that the shift position is moved to a shift-down mode "−" shown in FIG. 4A is transmitted to the vehicle side, so that a shift-down operation of the vehicle is performed.

Thus, with respect to a manual operation having the shift-up mode "+" and the shift-down mode "−," the vehicular shift device 500 uses a manual operation position that is a reference position by assigning it to the first position P1 of the operating member 1 of the operating device 100. The movement directions (tilting directions) in the Y direction in which the operating member 1 of the operating device 100 shifts between the first position P1 and the second position P2 are assigned to the second direction D2 of the shift operation of the vehicle.

As described above, the vehicular shift device 500 can perform shift operations corresponding to the shift pattern illustrated in FIG. 4A, using the operating device 100 tiltable in the first direction D1 and the second direction D2. For an easier understanding of the description, the first direction D1 and the second direction D2 of tilting operations are depicted in FIGS. 1 through 3 as well.

Next, the operating device 100 is described.

Figure 5:
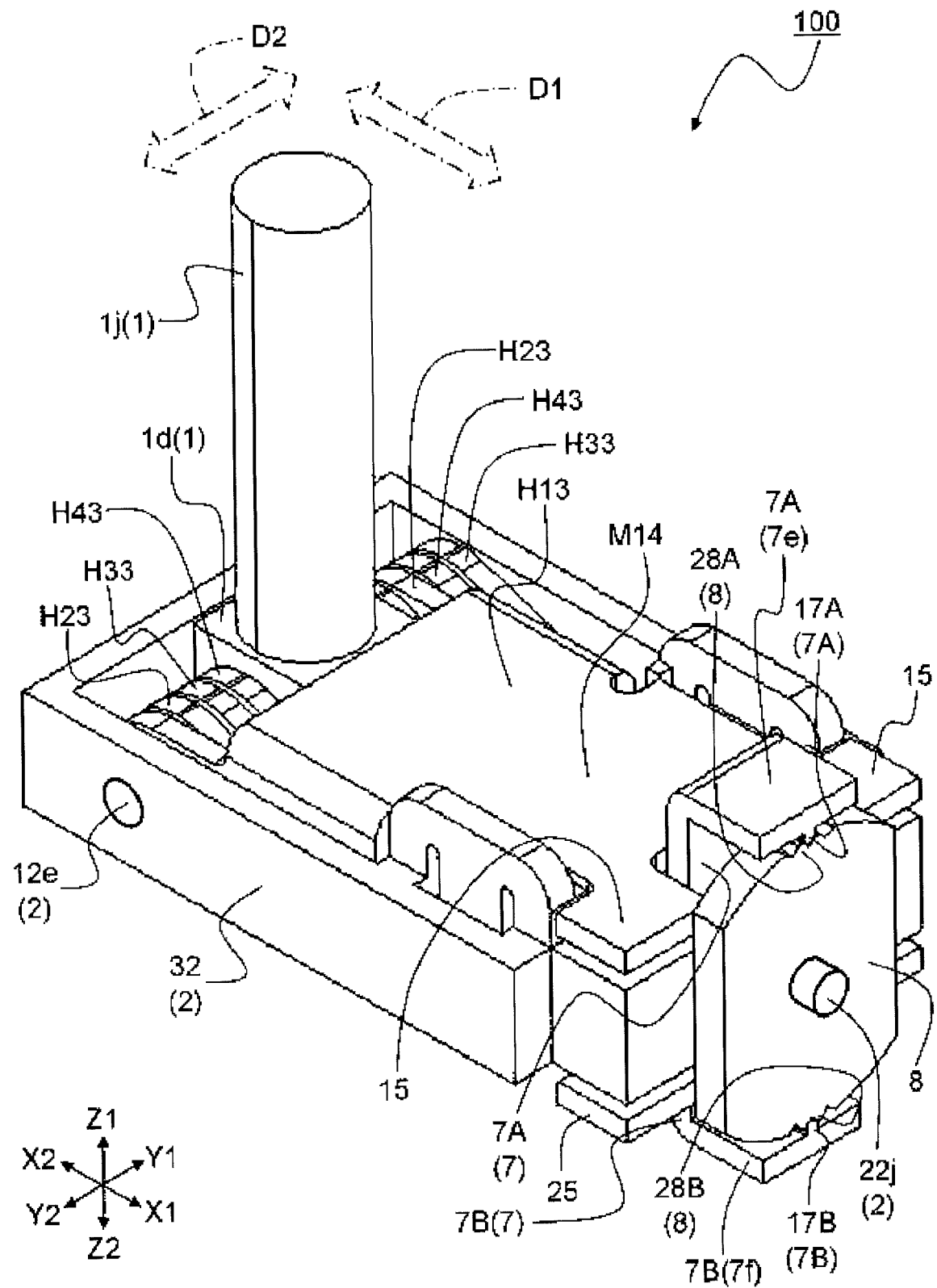
FIG. 5, which is a diagram illustrating the operating device of the first embodiment of the present invention, is a perspective view of a main part of the operating device.
Figure 6:
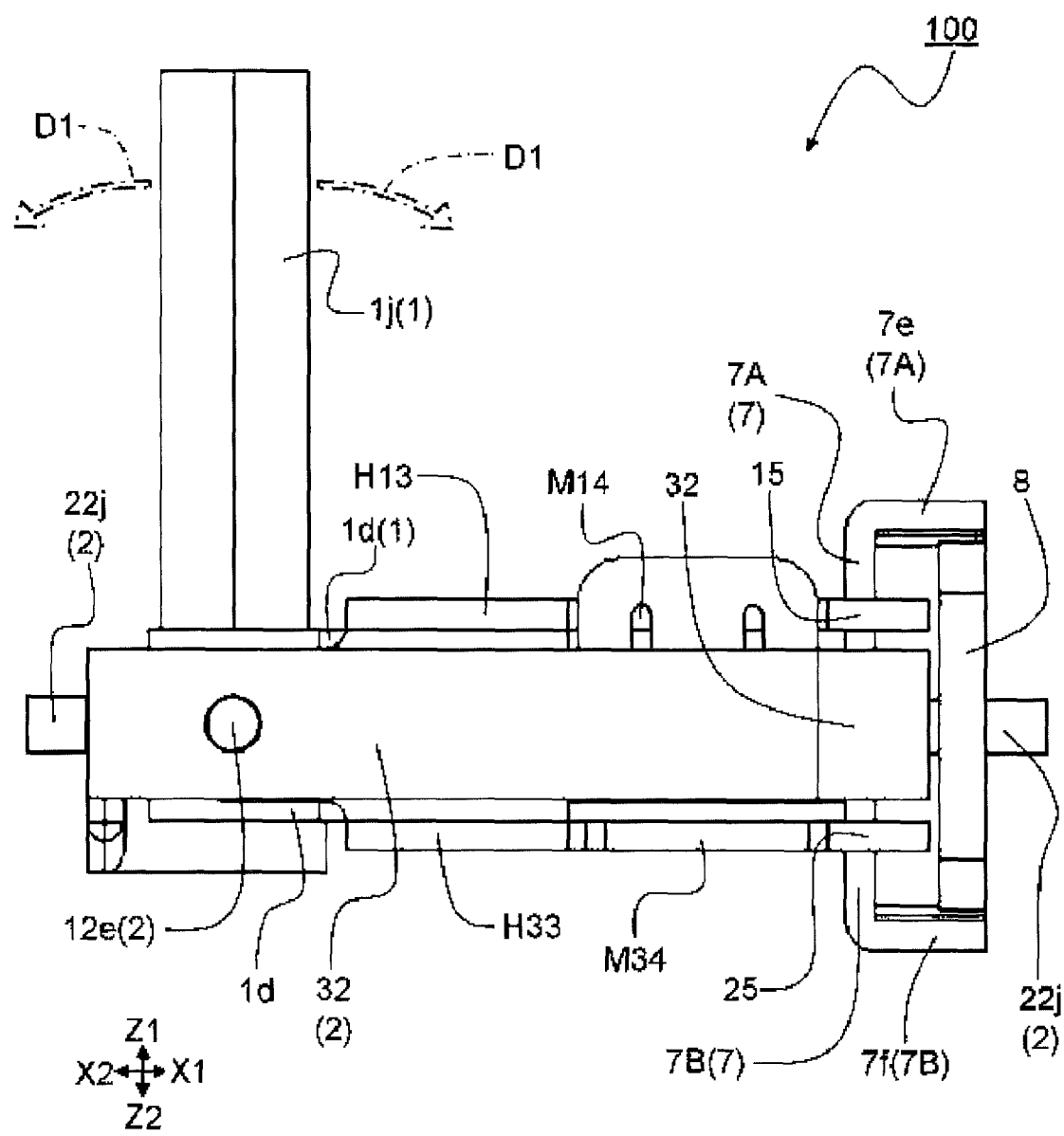
FIG. 6, which is a diagram illustrating the operating device of the first embodiment of the present invention, is a front view of the main part of the operating device.
Figure 7:
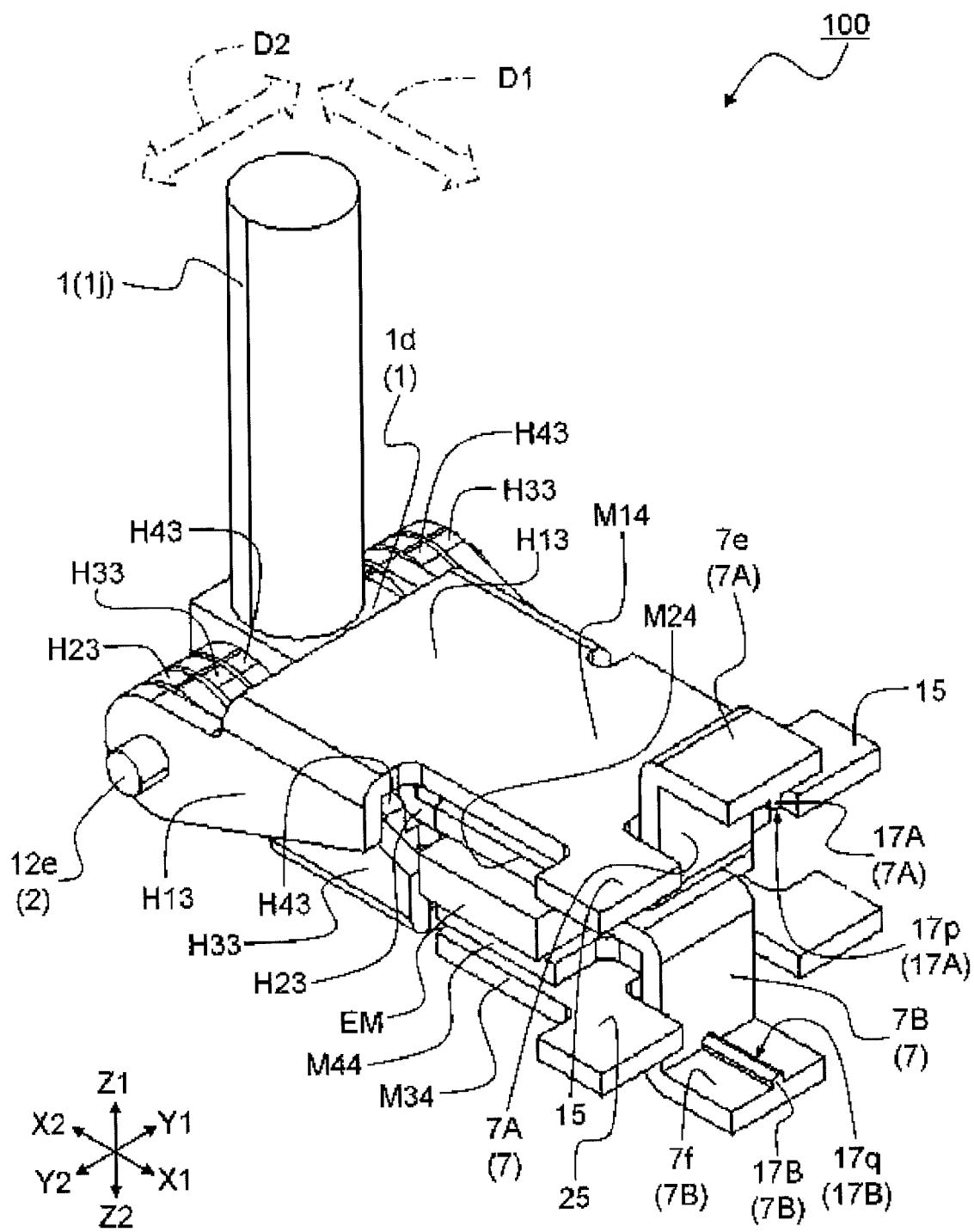
FIG. 7, which is a diagram illustrating the operating device of the first embodiment of the present invention, is a perspective view in which a frame, a cam member, and a second tilt shaft shown in FIG. 5 are omitted.
Figure 8A:
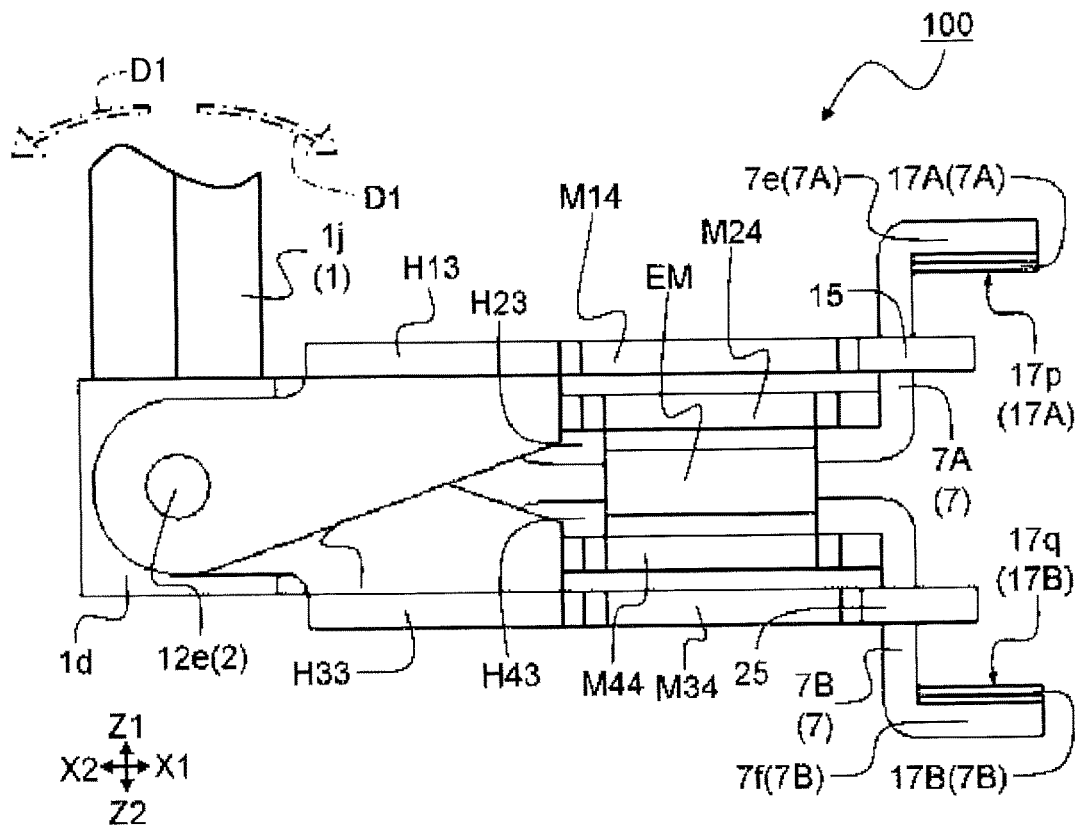
FIGS. 8A and 8B are diagrams illustrating the operating device of the first embodiment of the present invention, where
Figure 8B:
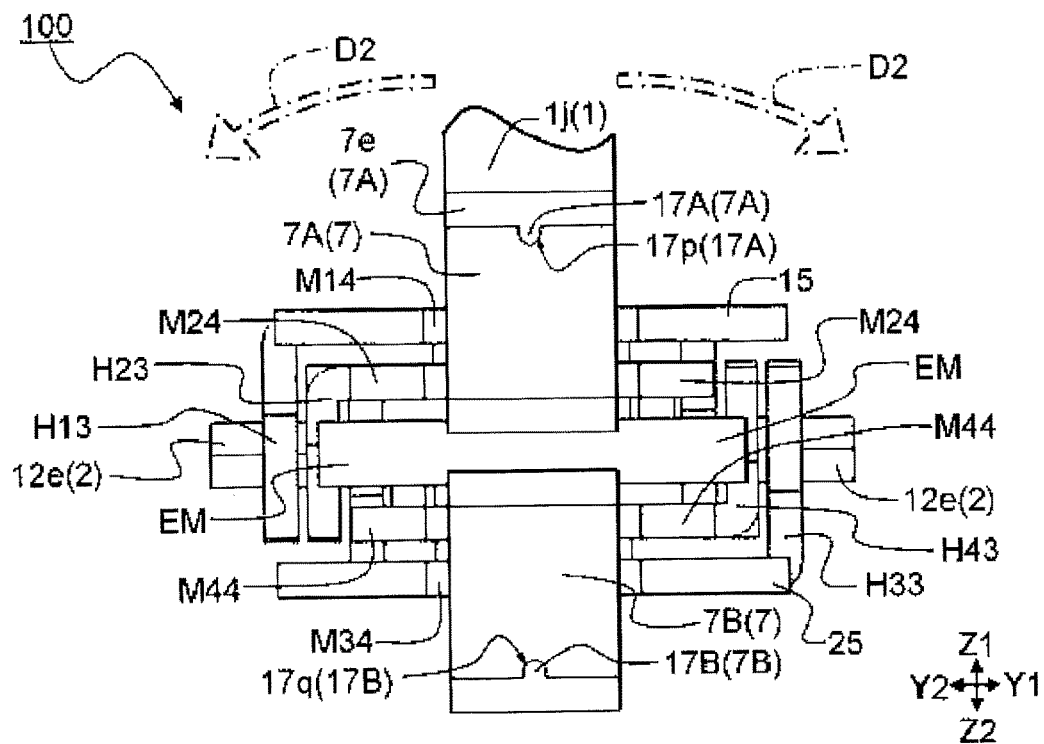
Figure 9A:
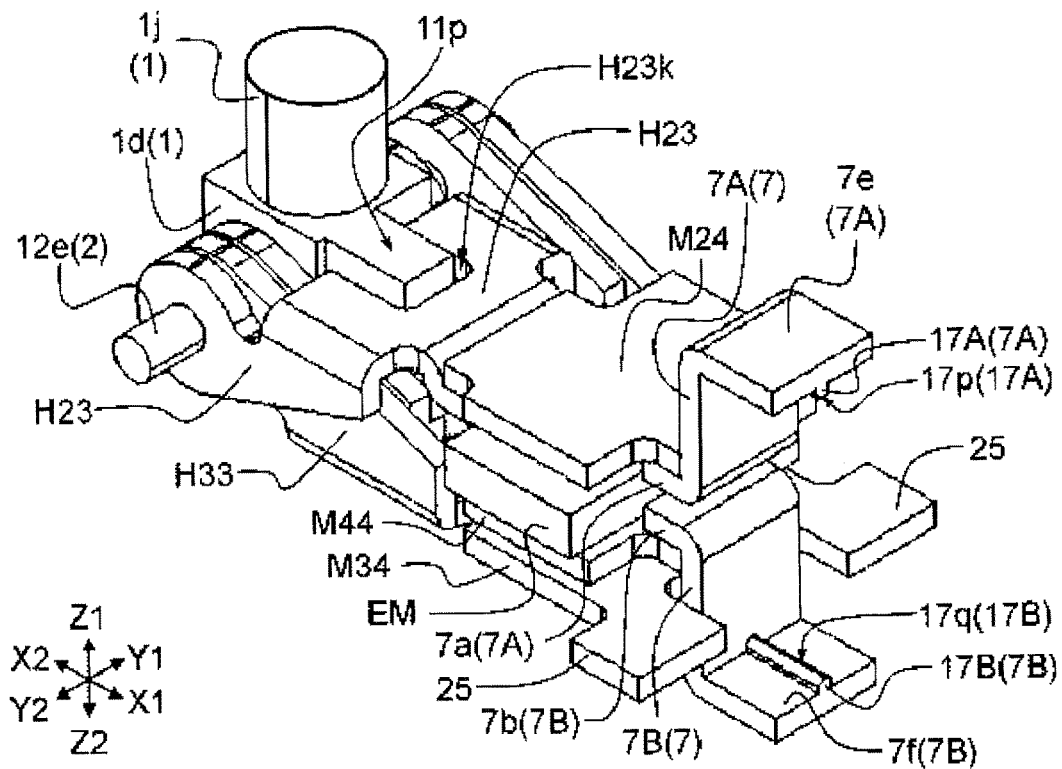
FIGS. 9A and 9B are diagrams illustrating the operating device of the first embodiment of the present invention, where
Figure 9B:
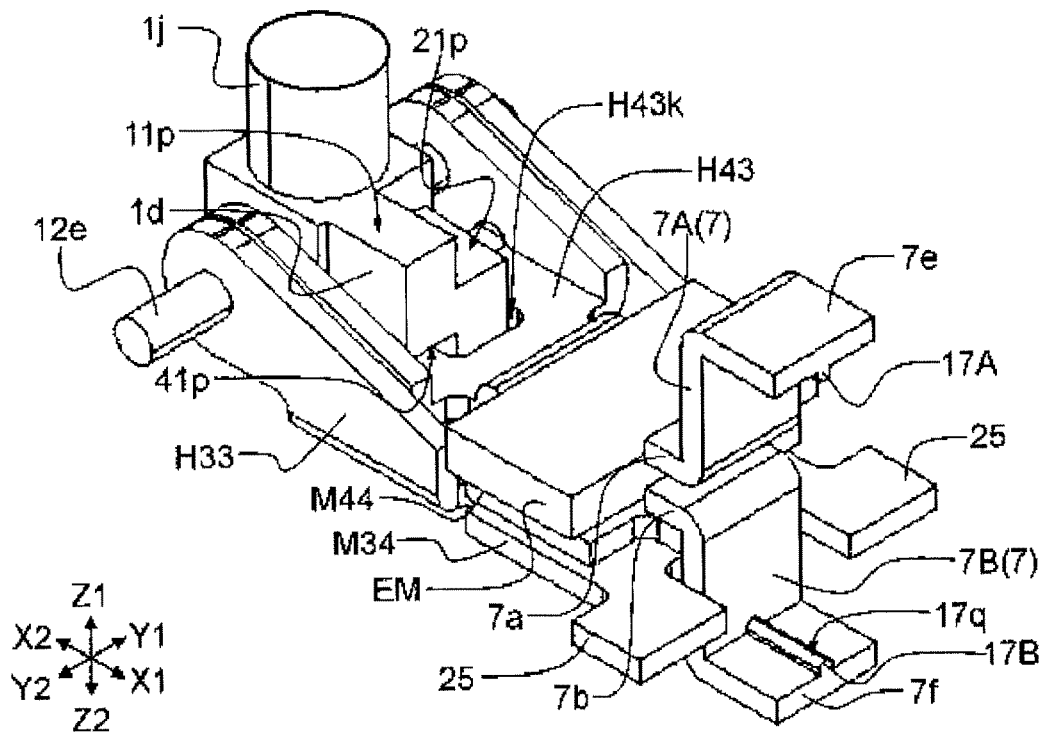
Figure 10A:
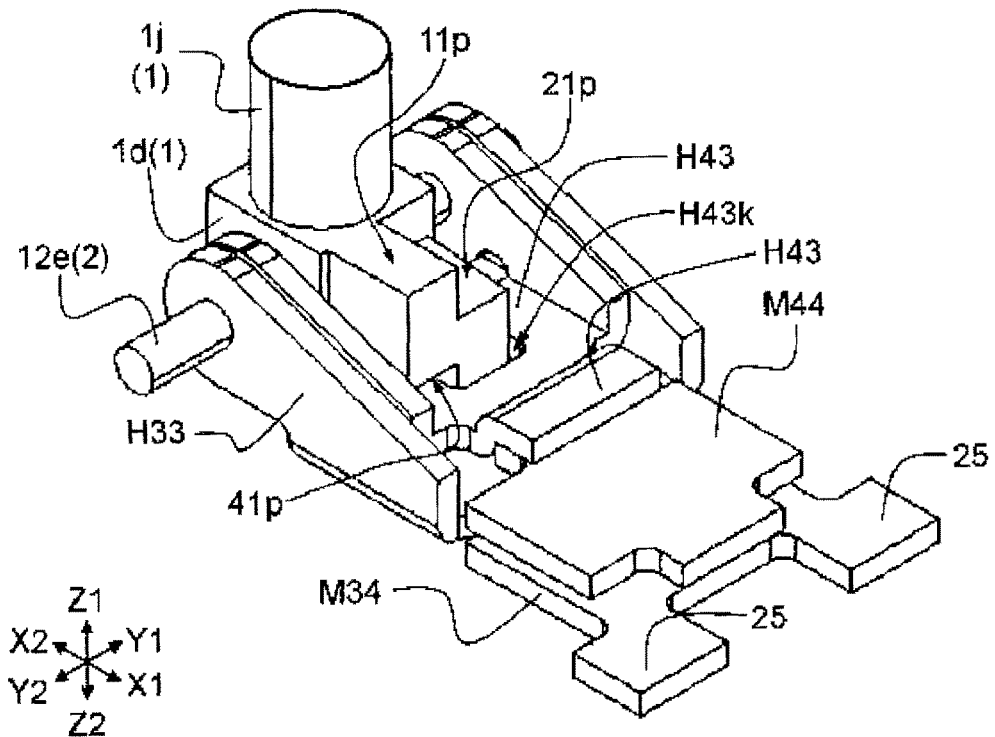
FIGS. 10A and 10B are diagrams illustrating the operating device of the first embodiment of the present invention, where
Figure 10B:
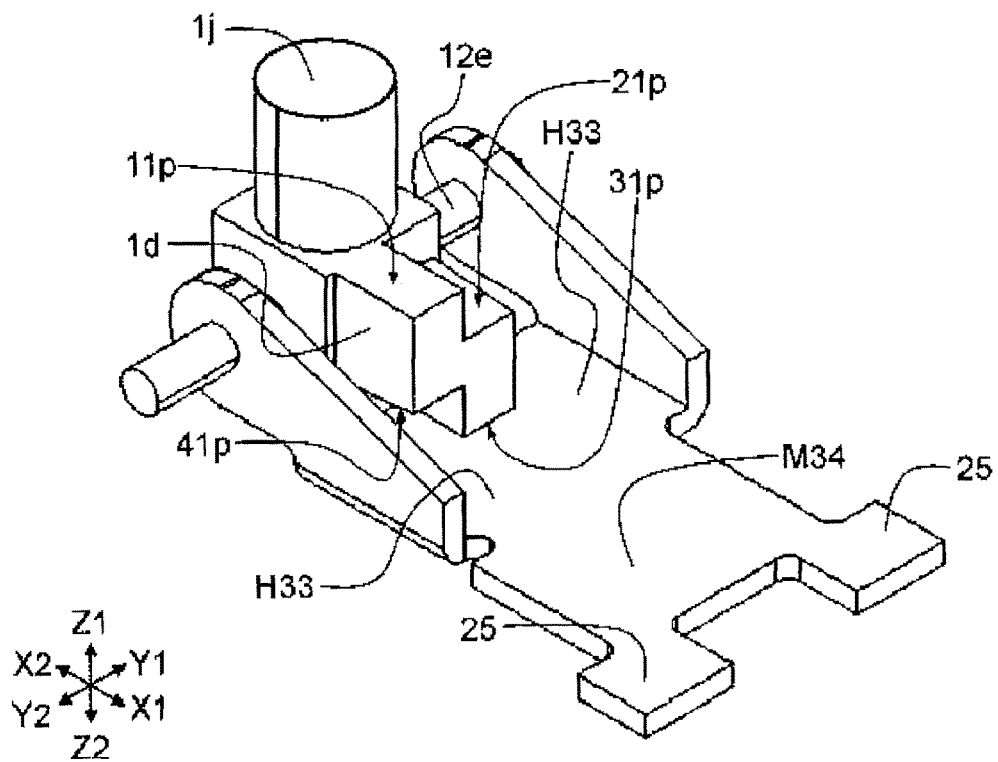

FIG. 5, which is a diagram illustrating the operating device 100 of the first embodiment of the present invention, is a perspective view of a main part of the operating device 100. FIG. 6 is a front view of the main part of the operating device 100. FIG. 7 is a perspective view in which a frame 32, a cam member 8, and the second tilt shaft 22j shown in FIG. 5 are omitted. FIG. 8A is a front view taken from the Y2 side shown in FIG. 7 and FIG. 8B is a side view taken from the X1 side shown in FIG. 7. FIG. 9A is a perspective view in which a first movable member H13 and a first magnetic body M14 shown in FIG. 7 are omitted and FIG. 9B is a perspective view in which a second movable member H23 and a second magnetic body M24 shown in FIG. 9A are omitted. FIG. 10A is a perspective view in which a drive member 7 and a permanent magnet EM shown in FIG. 9B are omitted and FIG. 10B is a perspective view in which a fourth movable member H43 and a fourth magnetic body M44 shown in FIG. 10A are omitted. In FIGS. 8A through 10B, part of the operating shaft 1j of the operating member 1 is omitted for an easier understanding of the description. Furthermore, FIGS. 5 through 10B illustrate the case where the operating member 1 is in a reference position without being tilted in the first direction D1, being positioned in the second position P2 in the second direction D2.

The operating device 100 according to the first embodiment of the present invention has an appearance as illustrated in FIG. 5 and, as illustrated in FIGS. 7 through 9B, includes the operating member 1 tiltable in response to an operator's operation, the support 2 supporting the operating member 1 so that the operating member 1 is tiltable, the first movable member H13 and the second movable member H23 (see FIG. 9A) that tilt in the first direction D1 (the X directions shown in each drawing) in conjunction with the operating member 1, the first magnetic body M14 provided on the first movable member H13, the second magnetic body M24 (see FIG. 9A) provided on the second movable member H23, and the permanent magnet EM (see FIG. 9B) supported by the support 2. When the operating member 1 is in the reference position, the first magnetic body M14 and the second magnetic body M24 are provided on one side (the upper Z1-direction side shown in each drawing) of the permanent magnet EM in proximity to each other, and the first and second magnetic bodies M14 and M24 and the permanent magnet EM attract each other.

Furthermore, according to the first embodiment of the present invention, as illustrated in FIGS. 7 through 10B, the operating device 100 includes a third movable member H33 (see FIG. 10B) and the fourth movable member H43 (see FIG. 10A) that tilt in the first direction D1 (the X directions shown in each drawing) in conjunction with the operating member 1, a third magnetic body M34 (see FIG. 10B) provided on the third movable member H33, and the fourth magnetic body M44 (see FIG. 10A) provided on the fourth movable member H43. When the operating member 1 is in the reference position, the third magnetic body M34 and the fourth magnetic body M44 are provided on the other side (the lower Z2-direction side shown in each drawing) of the permanent magnet EM in proximity to each other, and the third and fourth magnetic bodies M34 and M44 and the permanent magnet EM attract each other.

Furthermore, according to the first embodiment of the present invention, as illustrated in FIG. 9A, the operating device 100 includes the drive member 7 provided on the second magnetic body M24 to pivot with a tilting operation (referred to as a drive member 7A) and the drive member 7 provided on the fourth magnetic body M44 to pivot with a tilting operation (referred to as a drive member 7B). Furthermore, as illustrated in FIGS. 5 and 6, the operating device 100 includes the cam member 8 provided on the case K2 to face one side of the drive member 7 (the drive member 7A and the drive member 7B). The second tilt shaft 22$j$ is rotatably inserted through a central portion of the cam member 8.

The operating device 100 is operable in multiple directions with the operating member 1 being tiltable in the front-rear first direction D1 (the X directions shown in each drawing) and tiltable in the left-right second direction D2 (the Y directions shown in each drawing) crossing (in the first embodiment of the present invention, orthogonal to) the first direction D1 in response to an operator's operation.

First, the operating member 1 of the operating device 100 is described. FIGS. 11A and 11B are diagrams illustrating the operating member 1, where FIG. 11A is a perspective view of the operating member 1 and FIG. 11B is a front view of the operating member 1 taken from the Y2 side of FIG. 11A.

The operating member 1 is manufactured by injection molding of a synthetic resin material such as polybutylene terephthalate (PBT), and illustrated in FIGS. 11A and 11B, includes the pillar-shaped operating shaft 1$j$ that extends vertically (in the Z directions shown in FIG. 5) and a base part 1$d$ provided at the other end of the operating shaft 1$j$ and spreading in a plane through which the central axis of the operating shaft 1$j$ penetrates. While using a synthetic resin material, the operating member 1 is not limited to this, and may use, for example, a metal material such as zinc (Zn).

As illustrated in FIGS. 11A and 11B, the operating shaft 1$j$ of the operating member 1 is formed into a pillar shape, and is formed together with the base part 1$d$ as one piece. Furthermore, as illustrated in FIG. 2, an upper portion (a portion exposed on the upper surface of the cover K5) of the operating shaft 1$j$ is covered and engaged with the shift knob 50N of the vehicular shift device 500. A detailed description of the engagement structure of the operating shaft 1$j$ and the shift knob 50N, to which a widely-used common engagement structure is applicable, is omitted.

As illustrated in FIGS. 11A and 11B, the base part 1$d$ of the operating member 1 is provided at the other end (lower end) of the operating shaft 1$j$, and through holes 1$h$ that pierce through in directions (the Y directions shown in FIG. 11A) orthogonal to the extending directions (the X directions shown in FIGS. 11A and 11B) of the base part 1$d$ are provided in its central portion. The tilt shaft 12$e$ (the first tilt shaft) of the support 2, which enables tilting of the operating member 1, is inserted through and fitted into these through holes 1$h$. The base part 1$d$ is configured to pivot in conjunction with the tilting of the operating member 1 in the first direction D1 (the X directions shown in FIG. 11).

Furthermore, when the operating device 100 is assembled, the base part 1$d$ is provided between the first movable member H13 (the second movable member H23) and the third movable member H33 (the fourth movable member H43). As illustrated in FIGS. 9A through 11B, the base part 11$d$ includes a first pressing part 11$p$ and a second pressing part 21$p$ that can contact the first movable member H13 and the second movable member H23, respectively, when the base part 1$d$ pivots about the tilt shaft 12$e$. The first pressing part 11$p$ and the second pressing part 21$p$ are provided on one side (the Z1-direction side shown in FIGS. 11A and 11B) of the base part 1$d$, and are placed opposite the first movable member H13 and the second movable member H23, respectively, so that the distance between the first movable member H13 and the first pressing part 11$p$ is smaller than the distance between the second movable member H23 and the second pressing part 21$p$ when the operating member 1 is in a reference position.

Furthermore, according to the first embodiment of the present invention, as illustrated in FIGS. 10B, 11A and 11B, the base part 11$d$ includes a third pressing part 31$p$ and a fourth pressing part 41$p$ that can contact the third movable member H33 and the fourth movable member H43, respectively, when the base part 1$d$ pivots about the tilt shaft 12$e$. The third pressing part 31$p$ and the fourth pressing part 41$p$ are provided on the other side (the Z2-direction side shown in FIGS. 11A and 11B) of the base part 1$d$, and are placed opposite the third movable member H33 and the fourth movable member H43, respectively, so that the distance between the third movable member H33 and the third pressing part 31$p$ is smaller than the distance between the fourth movable member H43 and the fourth pressing part 41$p$ when the operating member 1 is in a reference position.

Figure 12A:
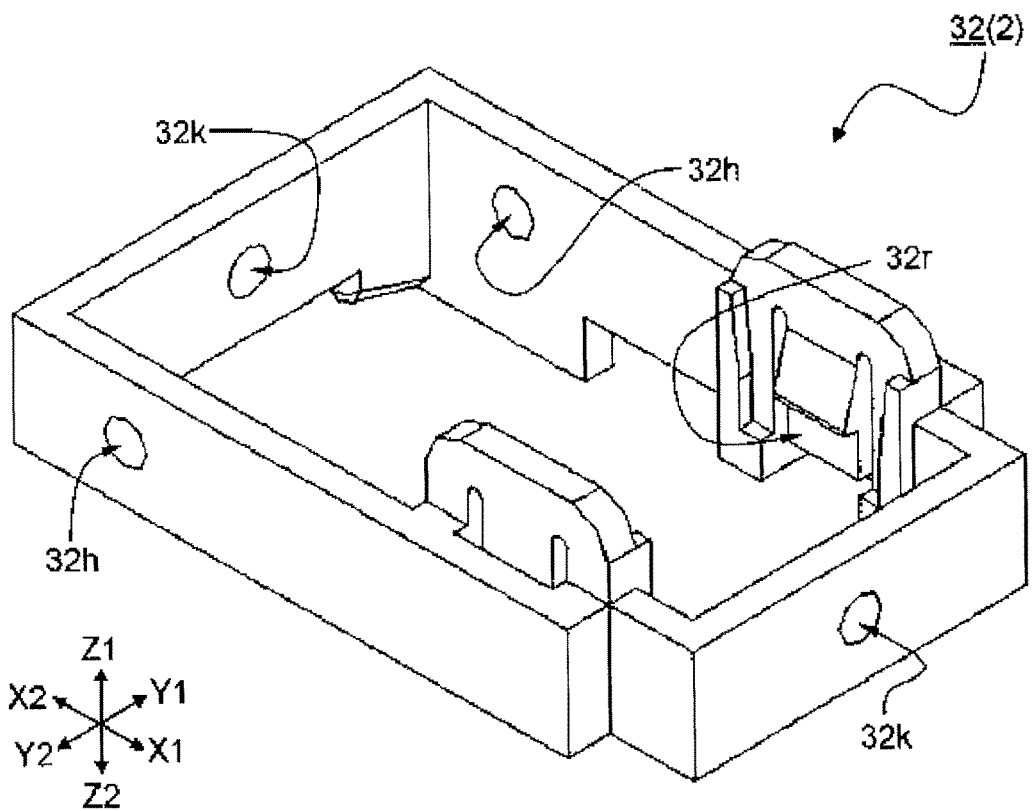
FIGS. 12A and 12B are diagrams illustrating a support of the operating device according to the first embodiment of the present invention, where
Figure 12B:
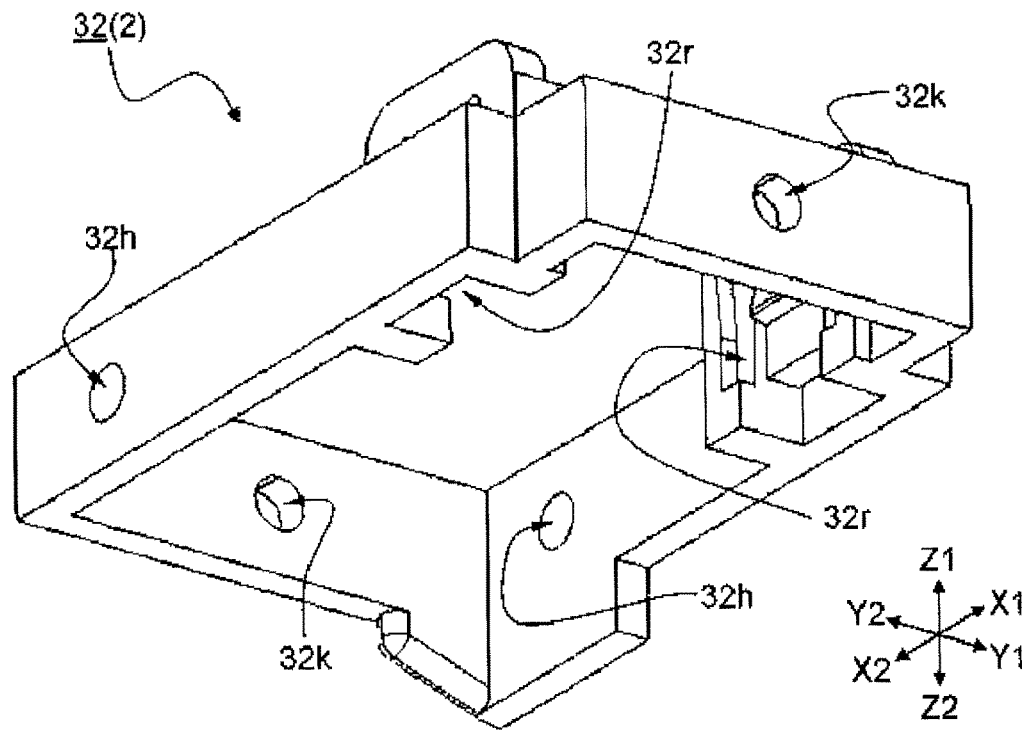

Next, the support 2 of the operating device 100 is described. FIG. 12A is an upper-side perspective view of the frame 32 of the support 2, and FIG. 12B is a lower-side perspective view of the frame 32 of the support 2.

As illustrated in FIGS. 5 and 6, the support 2 includes the tilt shaft 12$e$ (the first tilt shaft) that enables tilting (tilting in the first direction D1) of the operating member 1, the second tilt shaft 22$j$ whose axial direction is orthogonal to the tilt shaft 12$e$, the frame 32 that pivots about the second tilt shaft 22$j$ in response to tilting (tilting in the second direction D2) of the operating member 1, and the bearing parts 42$k$ (see FIG. 3), which are provided in the case K2 and have the second tilt shaft 22$j$ inserted therein to support the frame 32 so that the frame 32 is pivotable.

The tilt shaft 12$e$ of the support 2 is formed of a soft magnetic material such as iron, and is formed into a pillar shape. When the operating device 100 is assembled, this tilt shaft 12$e$ is inserted through the through holes 1$h$ of the base part 1$d$ of the operating member 1 to be fitted in the operating member 1, and is pivotably engaged with the frame 32 of the support 2.

Furthermore, when the operating device 100 is assembled, the tilt shaft 12$e$ is movably engaged with the first movable member H13, the second movable member H23, the third movable member H33, and the fourth movable member H43 as illustrated in FIG. 7. As a result, the base part 1$d$, the first movable member H13, the second movable member H23, the third movable member H33, and the fourth movable member H43 pivot (tilt) about the same tilt shaft 12$e$ of the support 2. This makes it possible to reduce the number of components and to efficiently use space to reduce size.

Next, the second tilt shaft 22j of the support 2 is formed of a soft magnetic material such as iron, and is formed into a pillar shape to be inserted through and fixed to the frame 32 (below-described holes 32k) as illustrated in FIGS. 5 and 6. When the operating device 100 is assembled, this second tilt shaft 22j is rotatably inserted into the bearing parts 42k provided in the case K2.

Next, the frame 32 of the support 2 is manufactured by injection molding of a synthetic rein material such as polybutylene terephthalate (PBT), and as illustrated in FIGS. 12A and 12B, is formed into a rectangular frame shape with an opening that is open at the upper surface and the lower surface. When the operating device 100 is assembled, the base part 1d of the operating member 1, the second movable member H23, the second magnetic body M24, the fourth movable member H43, the fourth magnetic body M44, and the permanent magnet EM are accommodated in an accommodating part of the frame 32, and the first movable member H13, the first magnetic body M14, the third movable member H33, and the third magnetic body M34 are positioned within the frame 32 in a top plan view.

Furthermore, as illustrated in FIGS. 12A and 12B, holes 32h are formed one in each of the longitudinal walls of the frame 32 that are opposite in the transverse directions (the Y directions shown in FIGS. 12A and 12B) of the frame 32 so that their central axes coincide with each other. The tilt shaft 12e is inserted into the holes 32h (see FIG. 5) so that the tilt shaft 12e is rotatably supported on the frame 32. As a result, the operating shaft 1j of the operating member 1 can pivot about this tilt shaft 12e (a pivot center) in the first direction D1, and the base part 1d of the operating member 1 as well can pivot about this tilt shaft 12e. The frame 32 does not move in conjunction with the tilting of the operating member 1 in the first direction D1, and is a member that does not tilt in the first direction D1.

Furthermore, as illustrated in FIGS. 12A and 12B, the holes 32k are formed one in each of the transverse walls of the frame 32 that are opposite in the longitudinal directions (the X directions shown in FIGS. 12A and 12B) of the frame 32 so that their central axes coincide with each other. As described above, the second tilt shaft 22j is inserted through and fitted into these holes 32k. When the operating device 100 is assembled, this second tilt shaft 22j is inserted into each of the bearing parts 42k provided in the case K2 to be rotatably supported (see FIG. 3). As a result, the frame 32 can pivot about this second tilt shaft 22j (a central axis) in the second direction D2, and the operating member 1 engaged with the frame 32 via the tilt shaft 12e as well can pivot about this second tilt shaft 22j in the second direction D2. Thus, the support 2 supports the operating member 1 so that the operating member 1 is tiltable in multiple directions (the first direction D1 and the second direction D2), using the tilt shaft (first tilt shaft) 12e, the second tilt shaft 22j, the frame 32, and the bearing parts 42k.

Furthermore, as illustrated in FIGS. 12A and 12B, fixing parts 32r protruding toward the inside of the accommodating part within the frame 32 are formed one on each of the opposite longitudinal walls of the frame 32. Although not depicted in detail, when the operating device 100 is assembled, the permanent magnet EM is fixed to these fixing parts 32r by means of snapping-in or the like.

Next, the movable members and the magnetic bodies of the operating device 100 are described. As described above, the operating device 100 according to the first embodiment of the present invention includes the first movable member H13, the second movable member H23, the third movable member H33, and the fourth movable member H43 as movable members. Furthermore, the operating device 100 includes the first magnetic body M14, the second magnetic body M24, the third magnetic body M34, and the fourth magnetic body M44 as magnetic bodies.

Furthermore, according to the first embodiment of the present invention, the first movable member H13 and the first magnetic body M14 are formed of a soft magnetic material such as iron, and are subjected to bending or the like to be formed together as one piece as illustrated in FIG. 7. Furthermore, the third movable member H33 and the third magnetic body M34 as well are formed of a soft magnetic material such as iron, and are subjected to bending or the like to be formed together as one piece as illustrated in FIG. 10B. This makes it possible to reduce the number of components of the operating device 100 and to reduce the thickness of this part. The first movable member H13 and the first magnetic body M14 and the third movable member H33 and the third magnetic body M34, which are preferably formed together as one piece according to the first embodiment, are not limited to this, and may be separately formed.

First, the movable members of the operating device 100 include the first movable member H13, which is placed opposite the first pressing part 11p of the base part 1d of the operating member 1, the second movable member H23, which is placed opposite the second pressing part 21p of the base part 1d, the third movable member H33, which is placed opposite the third pressing part 31p of the base part 1d, and the fourth movable member H43, which is placed opposite the fourth pressing part 41p of the base part 1d. These four movable members tilt in conjunction with the tilting of the base part 1d caused by the tilting of the operating member 1. While the first movable member H13 and the third movable member H33 are formed of a soft magnetic material, the second movable member H23 and the fourth movable member H43 are formed of a non-magnetic material such as aluminum. Furthermore, the second movable member H23 and the fourth movable member H43 as well are manufactured by being subjected to bending or the like.

Furthermore, as illustrated in FIG. 7, the first movable member H13 and the second movable member H23 have respective one ends loosely fitted pivotably to the tilt shaft 12e to pivot about the tilt shaft 12e independent of each other. Here, a clearance H23k, which is a U-shaped cut, is provided in the second movable member H23 as illustrated in FIG. 9A, and this clearance H23k makes it possible to avoid interference (contact) with the first pressing part 11p of the base part 1d.

When the operating member 1 is tilted in one direction with respect to the first direction D1 (the X2 direction shown in FIG. 8A), the first pressing part 11p (see FIGS. 11A and 11B) of the base part 1d tilting in the one direction presses the first movable member H13 facing the first pressing part 11p, and further, when the tilting in the one direction continues, the second pressing part 21p (see FIGS. 11A and 11B) of the base part 1d presses the second movable member H23 facing the second pressing part 21p.

Likewise, according to the first embodiment of the present invention, the third movable member H33 and the fourth movable member H43 have respective one ends loosely fitted pivotably to the tilt shaft 12e to pivot about the tilt shaft 12e independent of each other. Here, the same as in the second movable member H23, a clearance H43k, which is a U-shaped cut, is provided in the fourth movable member H43 as illustrated in FIG. 9B, and this clearance H43k makes it possible to avoid interference (contact) with the third pressing part 31p of the base part 1d.

When the operating member 1 is tilted in the other direction with respect to the first direction D1 (the X1 direction shown in FIG. 8A), the third pressing part 31p (see FIGS. 11A and 11B) of the base part 1d tilting in the other direction presses the third movable member H33 facing the third pressing part 31p, and further, when the tilting in the other direction continues, the fourth pressing part 41p (see FIGS. 11A and 11B) of the base part 1d presses the fourth movable member H43 facing the fourth pressing part 41p.

Next, the magnetic bodies of the operating device 100 include the first magnetic body M14 (see FIG. 7) provided on (monolithically formed with) the first movable member H13, the second magnetic body M24 (see FIG. 9A) provided on the second movable member H23, the third magnetic body M34 (see FIG. 10B) provided on (monolithically formed with) the third movable member H33, and the fourth magnetic body M44 (see FIG. 10A) provided on the fourth movable member H43.

The second magnetic body M24 and the fourth magnetic body M44 are manufactured by cutting or the like to be formed into a plate shape, using a plate-shaped member of a soft magnetic material such as iron. The second magnetic body M24 and the fourth magnetic body M44 are joined to the second movable member H23 and the fourth movable member H43 by means of spot welding or the like to move together with the second movable member H23 and the fourth movable member H43, respectively.

As illustrated in FIG. 8A, the first magnetic body M14 is placed on one side (the Z1 direction side shown in FIGS. 8A and 8B) of the permanent magnet EM, and the third magnetic body M34 is placed on the other side (the Z2 direction side shown in FIGS. 8A and 8B) of the permanent magnet EM.

Furthermore, the second magnetic body M24 is placed between the first magnetic body M14 and the permanent magnet EM, and the fourth magnetic body M44 is placed between the third magnetic body M34 and the permanent magnet EM. Because the second movable member H23 supporting the second magnetic body M24 and the fourth movable member H43 supporting the fourth magnetic body M44 are formed of a non-magnetic material, a magnetic flux from the permanent magnet EM to the second magnetic body M24 or the fourth magnetic body M44 is prevented from spreading to the second movable member H23 or the fourth movable member H43, so that a magnetic flux path is formed only in the narrow region of the second magnetic body M24 and the fourth magnetic body M44. Therefore, the first magnetic body M14 and the third magnetic body M34, which are at more distant positions from the permanent magnet EM than are the second magnetic body M24 and the fourth magnetic body M44, can form a magnetic flux path that allows passage of much magnetic flux from the permanent magnet EM outside the region of the second magnetic body M24 and the fourth magnetic body M44. This makes it possible to ensure a sufficient force of attraction to the permanent magnet EM in the first magnetic body M14 and the third magnetic body M34.

Furthermore, according to the first embodiment of the present invention, the first movable member H13 and the first magnetic body M14, which are monolithically formed of a soft magnetic material, and the third movable member H33 and the third magnetic body M34, which are monolithically formed of a soft magnetic material, are so placed as to cover the permanent magnet EM, the second magnetic body M24, and the fourth magnetic body M44, and the tilt shaft 12e, with which the first movable member H13 and the third movable member H33 engages at one end, is formed of a soft magnetic material. As a result, the first magnetic body M14, the first movable member H13, the tilt shaft 12e, the third movable member H33, and the third magnetic body M34 can form a path for a magnetic flux generated from the permanent magnet EM. Therefore, it is possible to strengthen a force of attraction to the permanent magnet EM in the first magnetic body M14 and the third magnetic body M34 and a force of attraction to the permanent magnet EM in the second magnetic body M24 and the fourth magnetic body M44.

Furthermore, as illustrated in FIG. 8B, a space of a certain interval is provided between each of the second magnetic body M24 and the fourth magnetic body M44 and the permanent magnet EM, between the first magnetic body M14 and the second magnetic body M24, and between the third magnetic body M34 and the fourth magnetic body M44 in their arrangement. To maintain this certain interval, the magnetic bodies or movable members are supported in a region not depicted to prevent the magnetic bodies and the permanent magnet EM from or the magnetic bodies from attracting each other because of the force of attraction of the permanent magnet EM. Specifically, according to the first embodiment of the present invention, the first magnetic body M14 is supported by an upper portion of the frame 32 and a first restricting part 15 (see FIG. 5) monolithically formed with the first magnetic body M14 at its end, the second magnetic body M24 is supported by the drive member 7A and the cam member 8, the third magnetic body M34 is supported by a lower portion of the frame 32 and a second restricting part 25 (see FIG. 5) monolithically famed with the third magnetic body M34 at its end, and the fourth magnetic body M44 is supported by the drive member 7B and the cam member 8. To prevent a contact sound from being produced when the frame 32 contacts the first restricting part 15 or the second restricting part 25, an undepicted buffer member is provided on the frame 32 or the restricting part (the first restricting part 15 or the second restricting part 25).

Next, the permanent magnet EM of the operating device 100 is described. The permanent magnet EM uses a common samarium-cobalt magnet or the like, and as illustrated in FIG. 9A, is formed into a rectangular plate shape. As described above, this permanent magnet EM is fixed to the fixing parts 32r of the frame 32, and is placed between the second magnetic body M24 and the fourth magnetic body M44. When the operating member 1 is in a reference position, the second magnetic body M24 is positioned between this permanent magnet EM and the first magnetic body M14, and the fourth magnetic body M44 is positioned between this permanent magnet EM and the third magnetic body M34.

Movements in the first direction D1 using the above-described components are described in detail with reference to schematic diagrams shown in FIGS. 8A, 13A through 13O and 14A through 14C. The movements in the first direction D1 described herein are described as movements made by an operator's tilting operations with the second position P2 serving as a reference position (see FIG. 4B).

Figure 13A:
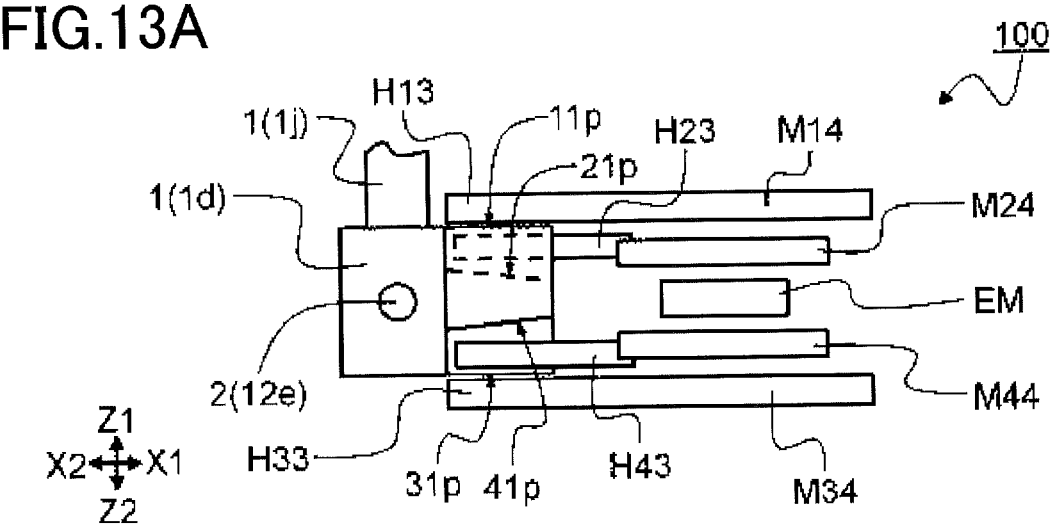
FIGS. 13A through 13C are schematic diagrams illustrating an operation in the operating device of the first embodiment of the present invention, where
Figure 13B:
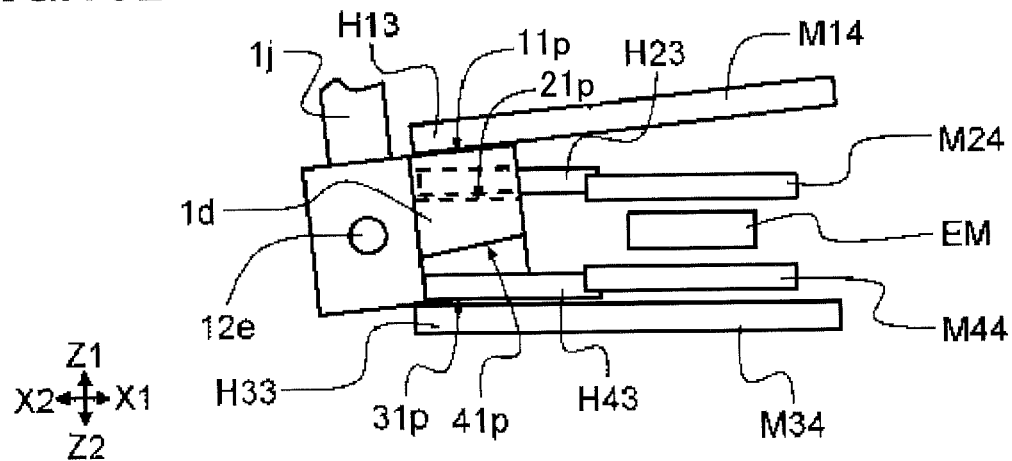
Figure 13C:
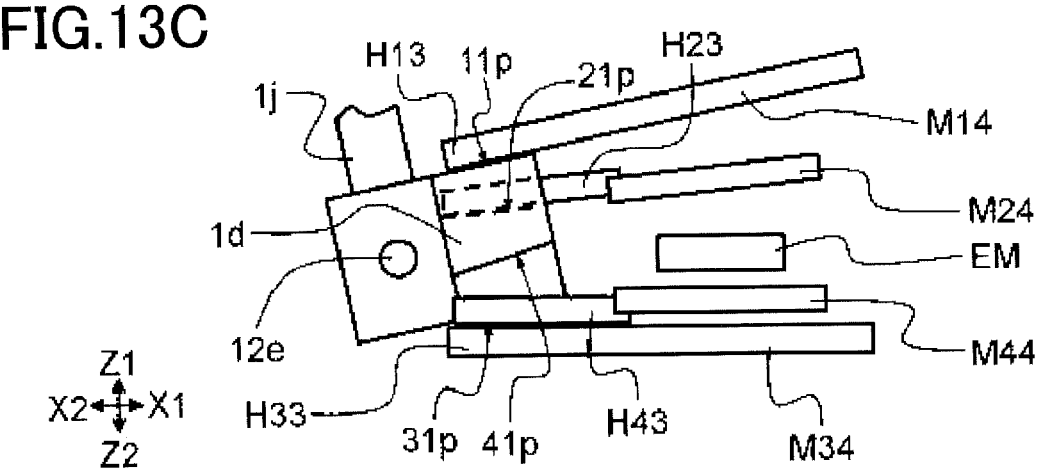
Figure 14A:
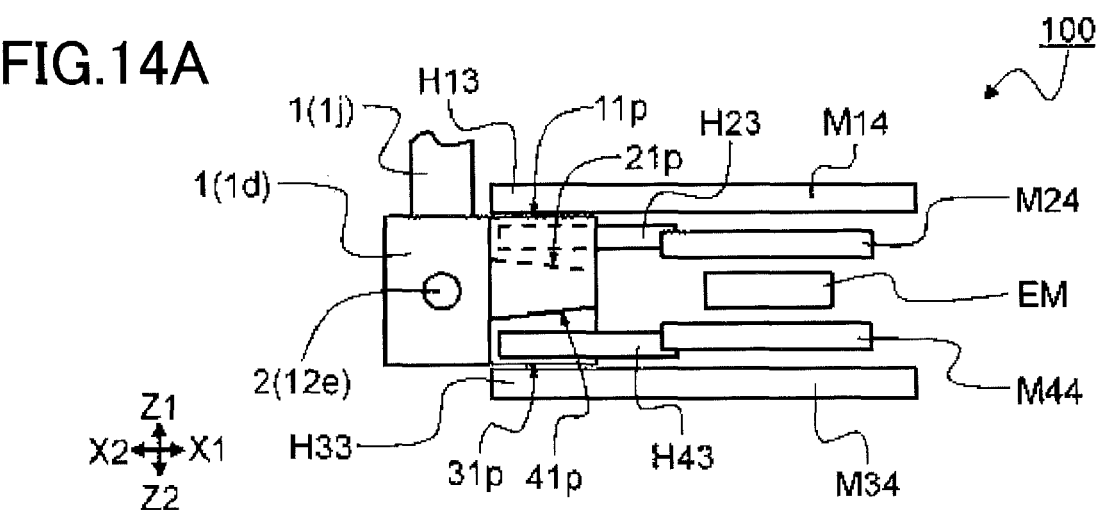
FIGS. 14A through 14C are schematic diagrams illustrating an operation in the operating device of the first embodiment of the present invention, where
Figure 14B:
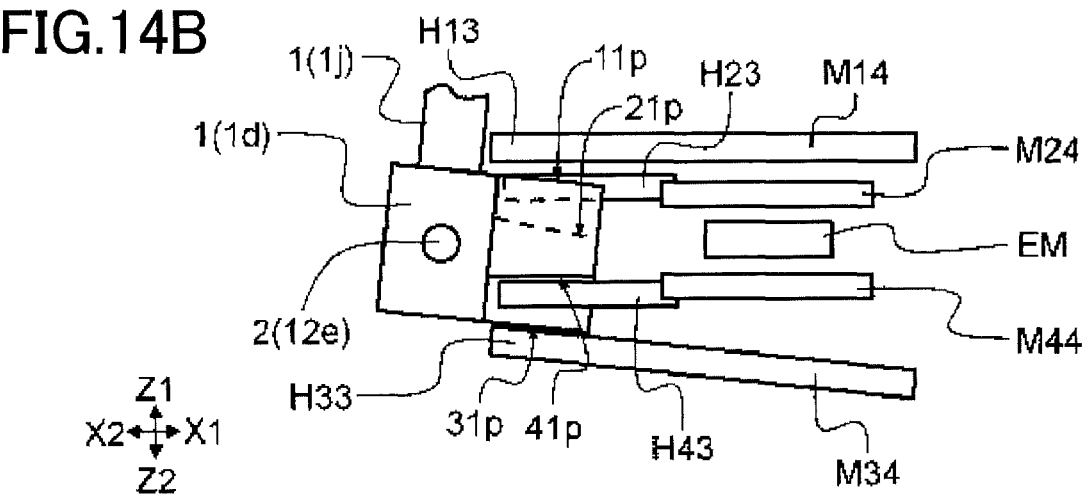
Figure 14C:
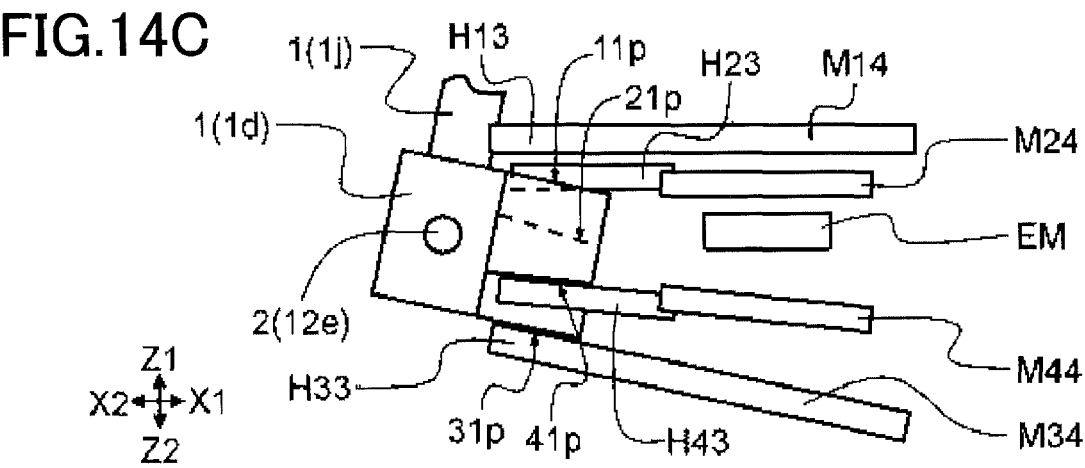

FIGS. 13A through 13C are schematic diagrams illustrating an operation in the first direction D1 in the operating device 100 of the first embodiment of the present invention, where FIG. 13A is a diagram of the state of a reference position, FIG. 13B is a diagram of the state of being tilted in one direction with respect to the first direction D1 (the X2 direction shown in FIG. 8A), and FIG. 13C is a diagram of the state of being further tilted in the one direction with respect to the first direction D1 compared with FIG. 13B. FIGS. 14A through 14C are schematic diagrams illustrating an operation in the first direction D1 in the operating device 100 of the first embodiment of the present invention, where FIG. 14A is a diagram of the same state of a reference position as FIG. 13A, FIG. 14B is a diagram of the state of being tilted in the other direction with respect to the first direction D1 (the X1 direction shown in FIG. 8A), and FIG. 14C is a diagram of the state of being further tilted in the other direction with respect to the first direction D1 compared with FIG. 14B. In FIGS. 13A through 13C and 14A through 14C, for an easier understanding of the description, part of the operating shaft 1j, the frame 32, the drive member 7, and the cam member 8 are omitted.

First, a tilting operation in the one direction (the X2 direction shown in FIGS. 13A through 13C) of the operating member 1 with respect to the first direction D1 is described using FIGS. 13A through 13C.

First, when the operating member 1 is in the reference position of the second position P2, as illustrated in FIG. 13A, the base part 1d of the operating member 1 is kept horizontal to the X directions, and the four movable members opposite this base part 1d (the first movable member H13, the second movable member H23, the third movable member H33, and the fourth movable member H43) as well are kept horizontal. The first magnetic body M14 and the third magnetic body M34, provided on (monolithic with) two of the movable members, and the second magnetic body M24 and the fourth magnetic body M44, provided on two of the movable members, are placed in proximity to and opposite each other across the permanent magnet EM. As a result, when the operating member 1 is in the reference position (the second position P2), the magnetic bodies are all attracted across the permanent magnet EM, thus producing the effect that no rattling is caused in the operating member 1.

Next, when the operator tilts the operating member 1 in the one direction (the X2 direction shown in FIG. 13A) from the reference position (the second position P2) shown in FIG. 13A, the operating member 1 pivots about the tilt shaft 12e, and the base part 1d as well pivots about the tilt shaft 12e. Then, the first pressing part 11p (see FIGS. 11A and 11B) of the base part 1d presses the opposing first movable member H13, so that the first movable member H13 pivots upward. Then, with the tilting of the first movable member H13, the first magnetic body M14 monolithic with the first movable member H13 as well pivots to tilt in the one direction.

As a result, as illustrated in FIG. 13B, the first magnetic body M14 moves away from the permanent magnet EM fixed to the frame 32, so that the state of attraction between the first magnetic body M14 and the permanent magnet EM changes from strong attraction to weak attraction. At this point, the operating member 1 moves from the second position P2 to the front first position S21 (see FIG. 4B), and the operator can have a sense of moderation (a clicking sensation) in moving from the second position P2 to the front first position S21.

When the operator continues tilting the operating member 1 further in the one direction (the X2 direction) from the position shown in FIG. 13B (the front first position S21), the operating member 1 further pivots, so that the base part 1d as well further pivots. As a result, the second pressing part 21p (see FIG. 11A) of the base part 1d presses the opposing second movable member H23, so that the second movable member H23 pivots upward. Then, with the tilting of the second movable member H23, the second magnetic body M24 provided on the second movable member H23 as well pivots to tilt in the one direction.

As a result, as illustrated in FIG. 13C, the second magnetic body M24 moves away from the permanent magnet EM, so that the state of attraction between the second magnetic body M24 and the permanent magnet EM changes from strong attraction to weak attraction. At this point, the operating member 1 moves from the front first position S21 to the front second position S22 (see FIG. 4B), and the operator can have a sense of moderation (a clicking sensation) in moving from the front first position S21 to the front second position S22. The first movable member H13 also further pivots, but is already in the state of weak attraction. Therefore, this pivoting hardly affects the sense of moderation.

According to the thus configured operating device 100 of the first embodiment of the present invention, when the operating member 1 is tilted in one direction with respect to the first position D1 from the reference position (the second position P2) to be in multiple positions, as illustrated in FIGS. 13A through 13C, first, the first magnetic body M14 moves away from the permanent magnet EM, and then, the second magnetic body M24 moves away from the permanent magnet EM. As a result, for example, when switching from the reference position to the next position, and then switching from the next position to the position after the next position, the strong attraction between magnetic bodies (the first magnetic body M14 and the second magnetic body M24) and the permanent magnet EM changes to weak attraction, so that the operator can have a sense of moderation. Thus, because there is no sliding mechanism in a part that generates a sense of moderation, it is possible to provide the operating device 100 with good durability compared with the conventional case.

Furthermore, because magnetic bodies (the first magnetic body M14 and the second magnetic body M24) and the permanent magnet EM are used in a part that generates a sense of moderation, it is possible to reduce size compared with the conventional case of using the moderating spring 909 and the moderating body 910.

Furthermore, the operating device 100 according to the first embodiment of the present invention is specifically configured so that when the operating member 1 is tilted in the one direction (the X2 direction shown in FIGS. 13A through 13C), the first pressing part 11p of the base part 1d presses the opposing first movable member H13 so that the first magnetic body M14 monolithic with the first movable member H13 tilts to move away from the permanent magnet EM, and when the tilting operation in the one direction further continues, the second pressing part 21p presses the opposing second movable member H23 so that the second magnetic body M24 provided on the second movable member H23 tilts to move away from the permanent magnet EM. As a result, by simply placing the first pressing part 11p and the second pressing part 21p opposite the first movable member H13 and the second movable member H23, respectively, so that the distance between the first pressing part 11p and the first movable member H13 is smaller than the distance between the second pressing part 21p and the second movable member H23 when the operating member 1 is in the reference position, the first magnetic body M14 and the second magnetic body M24 can sequentially move away from the permanent magnet EM. This makes it possible to facilitate manufacture of the operating device 100 with a sense of moderation.

Next, the operating device 100 according to the first embodiment of the present invention is configured the same in the tilting operation of the operating member 1 in the other direction (the X1 direction shown in FIG. 13A). Therefore, the tilting operation of the operating member 1 in the other direction (the X1 direction shown in FIGS. 14A through 14C) with respect to the first direction D1 also is described using FIGS. 14A through 14C.

First, when the operator tilts the operating member 1 in the other direction (the X1 direction shown in FIG. 14A) from the reference position (the second position P2) shown in FIG. 14A, the operating member 1 pivots about the tilt shaft 12e, and the third pressing part 31p (see FIG. 11B) of the base part 1d presses the opposing third movable member H33, so that the third movable member H33 pivots downward. Then, with the tilting of the third movable member H33, the third magnetic body M34 monolithic with the third movable member H33 as well pivots to tilt in the other direction.

As a result, as illustrated in FIG. 14B, the third magnetic body M34 moves away from the permanent magnet EM fixed to the frame 32, so that the state of attraction between the third magnetic body M34 and the permanent magnet EM changes from strong attraction to weak attraction. At this point, the operating member 1 moves from the second position P2 to the rear first position S23 (see FIG. 4B), and the operator can have a sense of moderation (a clicking sensation) in moving from the second position P2 to the rear first position S23.

When the operator continues tilting the operating member 1 further in the other direction (the X1 direction) from the position shown in FIG. 14B (the rear first position S23), the operating member 1 further pivots, and the fourth pressing part 41p (see FIG. 11B) of the base part 1d presses the opposing fourth movable member H43, so that the fourth movable member H43 pivots downward. Then, with the tilting of the fourth movable member H43, the fourth magnetic body M44 provided on the fourth movable member H43 as well pivots to tilt in the other direction.

As a result, as illustrated in FIG. 14C, the fourth magnetic body M44 moves away from the permanent magnet EM, so that the state of attraction between the fourth magnetic body M44 and the permanent magnet EM changes from strong attraction to weak attraction. At this point, the operating member 1 moves from the rear first position S23 to the rear second position S24 (see FIG. 4B), and the operator can have a sense of moderation (a clicking sensation) in moving from the rear first position S23 to the rear second position S24. The third movable member H33 also further pivots, but is already in the state of weak attraction. Therefore, this pivoting hardly affects the sense of moderation.

According to the thus configured operating device 100 of the first embodiment of the present invention, when the operating member 1 is tilted in the other direction with respect to the first position D1 from the reference position (the second position P2) to be in multiple positions, as illustrated in FIGS. 14A through 14C, first, the third magnetic body M34 moves away from the permanent magnet EM, and then, the fourth magnetic body M44 moves away from the permanent magnet EM. As a result, for example, when switching from the reference position to the next position, and then switching from the next position to the position after the next position, the strong attraction between magnetic bodies (the third magnetic body M34 and the fourth magnetic body M44) and the permanent magnet EM changes to weak attraction, so that the operator can have a sense of moderation. Thus, because there is no sliding mechanism in a part that generates a sense of moderation, the durability is better with respect to the other direction with respect to the first direction D1 as well, compared with the conventional case.

Furthermore, the common permanent magnet EM is used for the one direction and the other direction with respect to the first direction D1. Therefore, even when tilting directions and positions are increased, there is no need to increase permanent magnets EM, so that it is possible to reduce cost. Furthermore, it is possible to reduce size compared with the conventional case of using the moderating spring 909 and the moderating body 910.

Furthermore, the operating device 100 according to the first embodiment of the present invention is specifically configured so that when the operating member 1 is tilted in the other direction (the X1 direction shown in FIGS. 14A through 14C), the third pressing part 31p of the base part 1d presses the opposing third movable member H33 so that the third magnetic body M34 monolithic with the third movable member H33 tilts to move away from the permanent magnet EM, and when the tilting operation in the other direction further continues, the fourth pressing part 41p presses the opposing fourth movable member H43 so that the fourth magnetic body M44 provided on the fourth movable member H43 tilts to move away from the permanent magnet EM. As a result, by simply placing the third pressing part 31p and the fourth pressing part 41p opposite the third movable member H33 and the fourth movable member H43, respectively, so that the distance between the third pressing part 31p and the third movable member H33 is smaller than the distance between the fourth pressing part 41p and the fourth movable member H43 when the operating member 1 is in the reference position, the third magnetic body M34 and the fourth magnetic body M44 can sequentially move away from the permanent magnet EM. This makes it possible to facilitate manufacture of the operating device 100 with a sense of moderation.

Furthermore, according to the first embodiment of the present invention, the permanent magnet EM and magnetic bodies (the first magnetic body M14, the second magnetic body M24, the third magnetic body M34, and the fourth magnetic body M44) are placed at such positions that forces of attraction exerted between the permanent magnet EM and the respective magnetic bodies do not disappear when the operating member 1 is tilted in the X2 direction or the X1 direction to move magnetic bodies away from the permanent magnet EM as illustrated in FIG. 13B and FIG. 13C or FIG. 14B and FIG. 14C. As a result, for example, when the operator's tilting force is removed in each position (the front first position S21, the front second position S22, the rear first position S23, and the rear second position S24), the first magnetic body M14, the second magnetic body M24, the third magnetic body M34, or the fourth magnetic body M44, separated from the permanent magnet EM, pivots in a direction to be strongly attracted to the permanent magnet EM because of a force of mutual attraction. This makes it possible to automatically return the operating member 1 to the reference position (the second position P2) without using a returning member for automatic return.

Thus, the operating device 100 according to the first embodiment of the present invention is configured so that the operator can tilt the operating member 1 in the one direction and the other direction (the X2 direction and the X1 direction) from the reference position with respect to the first direction D1. In the above description, movements in the first direction D1 are described in detail with the second position P2 serving as a reference position, while movements are the same in the case where the first position P1 is determined as a reference position. Therefore, a detailed description thereof is omitted.

Figure 15:
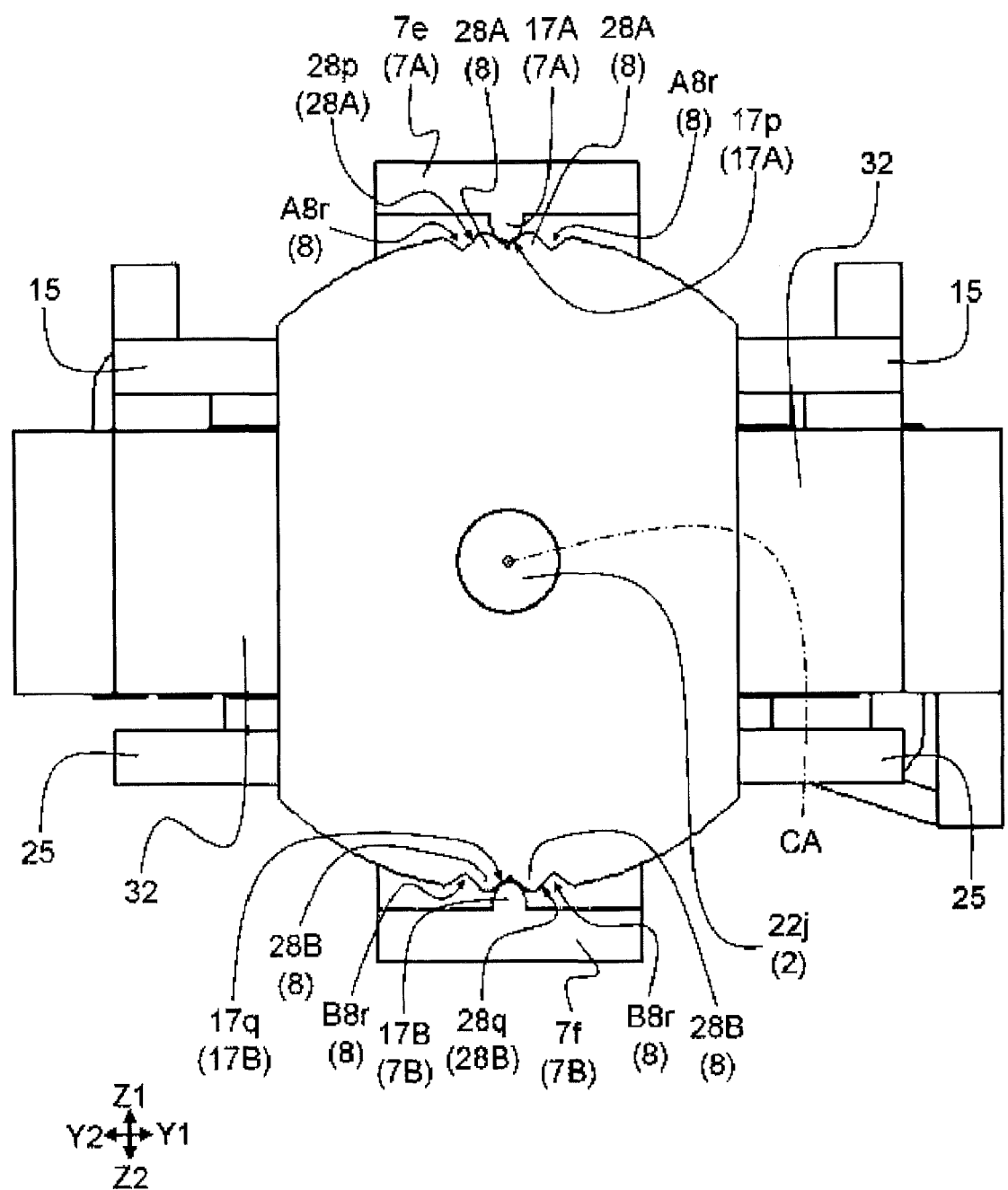
FIG. 15, which is a diagram illustrating the drive member and the cam member of the operating device according to the first embodiment of the present invention, is a side view taken from the X1 side of FIG. 5.

Next, the drive member 7 and the cam member 8 of the operating device 100 are described. FIG. 15, which is a diagram illustrating the drive member 7 and the cam member 8, is a side view taken from the X1 side of FIG. 5.

First, the drive member 7 of the operating device 100 is described. The drive member 7 is formed of a die casting of aluminum (Al) or the like, and as illustrated in FIGS. 9A and 9B, includes the two drive members 7A and 7B having a plate shape and bent at right angles at each end. The drive member 7A and the drive member 7B are formed into the same shape, and when the operating device 100 is assembled, are formed in a shape of point symmetry with respect to the central axis (CA shown in FIG. 15) of the second tilt shaft 22j when viewed from the X1 direction.

Furthermore, as illustrated in FIG. 9A, the drive member 7A is provided on the second magnetic body M24 with one bent end 7a engaged with the second magnetic body M24, to move with the tilting of the second magnetic body M24. Furthermore, as illustrated in FIG. 9B, the drive member 7B is provided on the fourth magnetic body M44 with one bent end 7b engaged with the fourth magnetic body M44, to move with the tilting of the fourth magnetic body M44. Therefore, with the tilting operations of the operating member 1, movable members (the second movable member H23 and the fourth movable member H43) and magnetic bodies (the second magnetic body M24 and the fourth magnetic body M44) pivot, and at the same time, the drive member 7 (the drive members 7A and 7B) pivot. The drive member 7A and the second magnetic body M24 are and the drive member 7B and the fourth magnetic body M44 are joined by means of spot welding or the like.

Furthermore, as illustrated in FIG. 15, another end 7e of the drive member 7A, which is bent, includes a first protrusion 17A formed into a shape protruding downward (in the Z2 direction shown in FIG. 15). One surface of the other end 7e, including a surface of this first protrusion 17A, serves as a sliding surface 17p. Furthermore, as illustrated in FIG. 15, another end 7f of the drive member 7B, which is bent, includes a first protrusion 17B formed into a shape protruding upward (in the Z1 direction shown in FIG. 15), the same as in the drive member 7A. One surface of the other end 7f, including a surface of this first protrusion 17B, serves as a sliding surface 17q. The first protrusion 17A and the first protrusion 17B are configured to be positioned in point symmetry with respect to the central axis (CA shown in FIG. 15) of the second tilt shaft 22j when viewed from the X1 side as illustrated in FIG. 15 when the operating device 100 is assembled.

Next, the cam member 8 of the operating device 100 is described. The cam member 8 is formed of a die casting of zinc (Zn) or the like, and as illustrated in FIG. 15, has a plate shape with upper and lower surfaces being rounded and opposing portions of both side surfaces being linearly formed. Furthermore, a through hole is formed in a central portion of the cam member 8 (a central portion of the round shape) in a thickness direction. The second tilt shaft 22j is rotatably inserted through this hole. When the operating device 100 is assembled, the cam member 8 is fixed to an inner sidewall of the case K2, facing the one surface of the other end 7e of the drive member 7A and the one surface of the other end 7f of the drive member 7B as illustrated in FIGS. 5 and 15. According to the first embodiment of the present invention, this sidewall of the case K2 is used as the support 2 supporting the cam member 8.

Furthermore, as illustrated in FIG. 15, the cam member 8 includes two second protrusions 28A formed into a shape protruding upward (in the Z1 direction shown in FIG. 15) and three recesses A8r having a depressed shape paired with the protruding shape on the side facing the first protrusion 17A of the drive member 7A. A surface including a surface of these second protrusions 28A (a surface facing the one surface of the other end 7e of the drive member 7A) serves as a guide surface 28p. Furthermore, the cam member 8 includes two second protrusions 28B formed into a shape protruding downward (in the Z2 direction shown in FIG. 15) and three recesses B8r having a depressed shape paired with the protruding shape on the side facing the first protrusion 17B of the drive member 7B. A surface including a surface of these second protrusions 28B (a surface facing the one surface of the other end 7f of the drive member 7B) also serves as a guide surface 28q. The second protrusions 28A and the second protrusions 28B are formed at positions that are point symmetric with respect to the central axis (CA shown in FIG. 15) of the second tilt shaft 22j when viewed from the X1 direction as illustrated in FIG. 15.

Here, a movement in the second direction D2 in the operating device 100 is described with reference to the drawings shown in FIG. 8B and FIGS. 15 through 17 to add a further description of the drive member 7 and the cam member 8. With respect to a shifting movement in the second direction D2, a movement made by an operator's tilting operation between the reference positions of the first position P1 and the second position P2 (see FIG. 4B) is described.

Figure 16A:
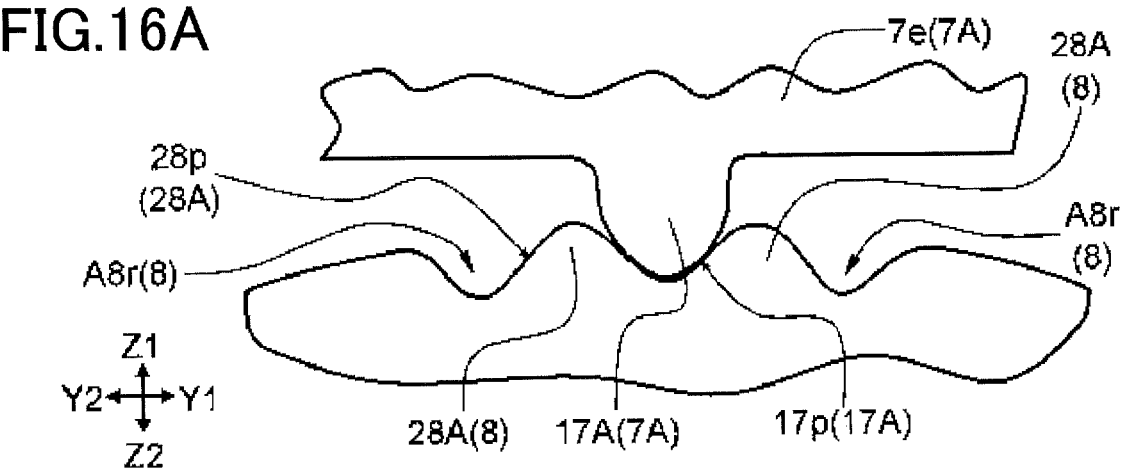
FIGS. 16A through 16C are schematic diagrams illustrating an operation in the operating device of the first embodiment of the present invention, where
Figure 16B:
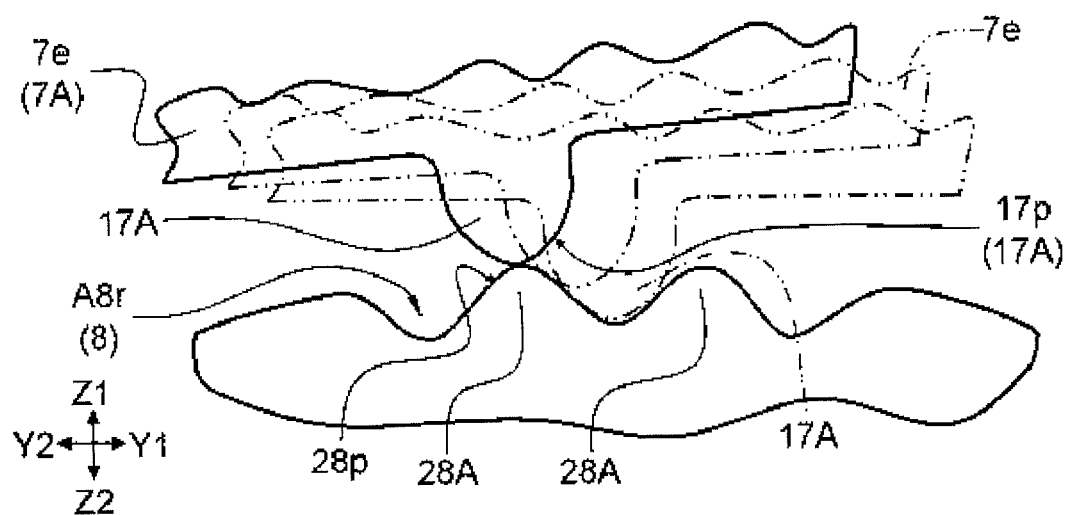
Figure 16C:
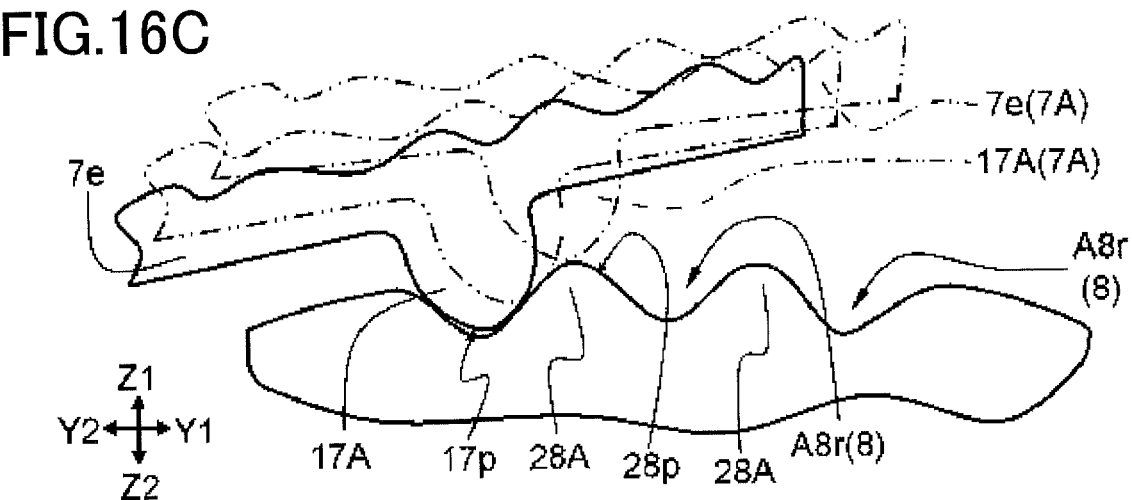
Figure 17:
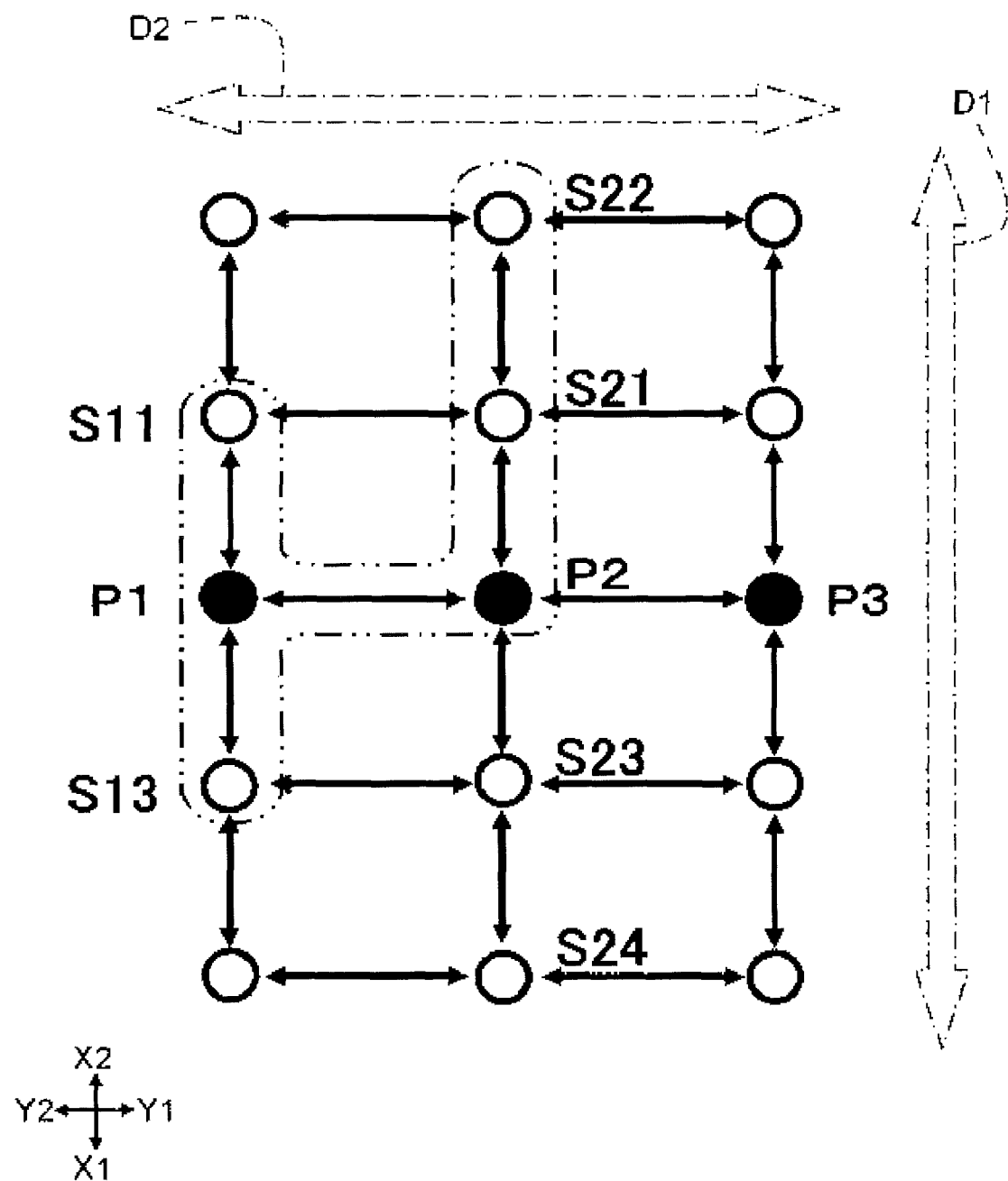
FIG. 17 is a schematic diagram illustrating positions of the operating device according to the first embodiment of the present invention.

FIGS. 16A through 16C are schematic diagrams illustrating an operation in the operating device 100 of the first embodiment of the present invention, where FIG. 16A is a diagram of the state where the operating member 1 is in the second position P2, FIG. 16B is a diagram of the state where the operating member 1 is between the second position P2 and the first position P1, and FIG. 16C is a diagram of the state where the operating member 1 is in the first position P1. Only the drive member 7A side is illustrated in FIGS. 16A through 16C, and the trajectory of the drive member 7A is indicated by the two-dot chain line in FIGS. 16B and 16C. FIG. 17 is a schematic diagram illustrating positions of the operating device 100 according to the first embodiment of the present invention. In FIG. 17, the shift layout (shift pattern) of the vehicular shift device 500 is indicated by the two-dot chain line.

First, in the second position P2 (see FIG. 17) that is the reference position illustrated in FIG. 16A, as illustrated in FIG. 8B, the second magnetic body M24 and the fourth magnetic body M44 are in proximity to and opposite each other across the permanent magnet EM to attract each other with a strong force. Therefore, as illustrated in FIG. 15, the sliding surface 17p of the drive member 7A provided on the second magnetic body M24 contacts the guide surface 28p of the cam member 8 fixed to the support 2 (a sidewall portion of the case K2) at the center recess A8r. Likewise, the sliding surface 17q of the drive member 7B contacts the guide surface 28q of the cam member 8 at the center recess B8r. As a result, the operating member 1 is retained in the second position P2.

Next, when the operator tilts the operating member 1 in one direction with respect to the second direction D2 (the Y2 direction shown in FIG. 8B) from the second position P2 that is the reference position illustrated in FIG. 4B, the drive member 7A moves in the one direction with the tilting of the operating member 1 as illustrated in FIG. 16B. At this point, the sliding surface 17p (mainly, a surface of the first protrusion 17A) of the drive member 7A slides on the guide surface 28p (mainly, a surface of the second protrusion 28A) of the cam member 8, so that the apex of the first protrusion 17A and the apex of the second protrusion 28A abut on each other as illustrated in FIG. 16B. Therefore, the drive member 7A moves upward (in the Z1 direction shown in FIGS. 16A through 16C) away from the cam member 8. Accordingly, the second magnetic body M24 combined with the drive member 7A as well moves following the shape of a protruding portion of the second protrusion 28A to move upward.

Likewise, although not depicted, with the tilting of the operating member 1 in the one direction with respect to the second direction D2, the drive member 7B on the opposite side of the second tilt shaft 22j from the drive member 7A moves in the other direction with respect to the second direction D2 (the Y1 direction shown in FIG. 8B). At this point, the sliding surface 17q (mainly, a surface of the first protrusion 17B) of the drive member 7B slides on the guide surface 28q (mainly, a surface of the second protrusion 28B) of the cam member 8, so that the apex of the first protrusion 17B and the apex of the second protrusion 28B abut on each other. Therefore, the drive member 7B moves downward (in the Z2 direction shown in FIG. 15) away from the cam member 8. Accordingly, the fourth magnetic body M44 combined with the drive member 7B as well moves following the shape of a protruding portion of the second protrusion 28B to move downward.

As a result, while the second magnetic body M24 and the fourth magnetic body M44, and the permanent magnet EM strongly attract each other when the operating member 1 is in the reference position (the second position P2), the second magnetic body M24 and the fourth magnetic body M44 move away from the permanent magnet EM when the operating member 1 is tilted in the second direction D2. Therefore, the strong attraction between the second magnetic body M24 and the permanent magnet EM and between the fourth magnetic body M44 and the permanent magnet EM changes to weak attraction.

When the operator further continues tilting the operating member 1 in the one direction from the position illustrated in FIG. 16B, as illustrated in FIG. 16C, the drive member 7A moves further in the one direction, and the sliding surface 17p of the drive member 7A slides on the guide surface 28p of the cam member 8, so that the drive member 7A moves to the next recess A8r in the one direction as illustrated in FIG. 16C. Likewise, although not depicted, the drive member 7B moves further in the other direction, and the sliding surface 17q of the drive member 7B slides on the guide surface 28q of the cam member 8, so that the drive member 7B moves to the next recess B8r in the other direction. As a result, the operating member 1 moves from the reference position (the second position P2) to the next position (the first position P1; see FIG. 17).

The guide surface 28p and the guide surface 28q of the cam member 8 are configured so that the drive member 7A moves downward (in the Z2 direction shown in FIGS. 16A through 16C) to approach the cam member 8 and the drive member 7B moves upward (in the Z1 direction shown in FIGS. 16A through 16C) to approach the cam member 8 at this point. Therefore, the state of attraction between the second magnetic body M24 and the permanent magnet EM and between the fourth magnetic body M44 and the permanent magnet EM changes again to strong attraction, so that the operating member 1 is retained in the next position (the first position P1).

Thus, when the operating member 1 is tilted in the second direction D2 from the reference position of the second position P2 to be positioned in the next position (the first position P1), the first protrusion 17A provided on the sliding surface 17p of the drive member 7A and the second protrusion 28A provided on the guide surface 28p of the cam member 8, abutting on each other, move up onto and slide on each other's protruding portion. Therefore, a magnetic body that moves together with the drive member 7A (the second magnetic body M24 in the first embodiment of the present invention) moves following the shape of the protruding portion. As a result, the magnetic body (the second magnetic body M24) and the permanent magnet EM are gradually separated and away from each other until the apexes of the first protrusion 17A and the second protrusion 28A abut on each other, and thereafter, come close to each other again. As a result, at this point, strong attraction changes to weak attraction, so that the operator can have a sense of moderation. Thus, because the magnetic body (the second magnetic body M24) and the permanent magnet EM are also used together with a simple cam structure, there is no need to add new components, and it is possible to reduce size compared with the conventional case.

Furthermore, according to the first embodiment of the present invention, another set of the first protrusion 17B of the drive member 7B and the second protrusion 28B of the cam member 8 is provided. Therefore, when the operating member 1 is tilted in the second direction D2 from the reference position of the second position P2 to be positioned in the next position (the first position P1), the first protrusion 17B of the sliding surface 17q and the second protrusion 28B of the guide surface 28q, abutting on each other, move up onto and slide on each other's protruding portion. Therefore, a magnetic body that moves together with the drive member 7B (the fourth magnetic body M44 in the first embodiment of the present invention) and the permanent magnet EM are gradually separated and away from each other until the apexes of the first protrusion 17B and the second protrusion 28B abut on each other, and thereafter, come close to each other again.

As a result, at this point, strong attraction changes to weak attraction, so that it is possible to further increase (approximately double) an operational load imposed on the operator with respect to a tilting operation in the second direction D2. Accordingly, the operator can have a stronger sense of moderation. Furthermore, by installing this cam mechanism at each outer end of the cam member 8, it is possible to perform a tilting operation in the second direction D2 with good balance. Furthermore, it is possible to reduce a sliding load on the drive member 7 and the cam member 8 per position, so that it is possible to increase durability. It goes without saying that the same operation is performed in the case of tilting in the second direction D2 from the reference position of the first position P1 to be positioned in the second position P2.

Furthermore, according to the first embodiment of the present invention, the cam member 8 further includes another set of the second protrusions 28A and the second protrusions 28B. Therefore, when the operator tilts the operating member 1 in the other direction with respect to the second direction D2 (the Y1 direction shown in FIG. 8B) from the second position P2 that is a reference position, the first protrusion 17A and the second protrusion 28A abutting on each other on the drive member 7A side move up onto and slide on each other's protruding portion. Then, the operating member 1 moves from the reference position (the second position P2) to the next position (a third position P3 shown in FIG. 17). In this case as well, the second magnetic body M24 and the permanent magnet EM are separated from each other to change the state of attraction from strong attraction to weak attraction, so that the operator can have a sense of moderation.

Thus, the operating device 100 according to the first embodiment of the present invention is configured so that the operator can tilt the operating member 1 in the one direction and the other direction (the Y2 direction and the Y1 direction) from the reference position with respect to the second direction D2 as well. According to the operating device 100, the operating member 1 can be positioned in fifteen positions as illustrated in FIG. 17. This enables application to various vehicles that differ in shift layout (shift pattern).

Thus, the operating device 100 of the first embodiment of the present invention can be suitably applied to the vehicular shift device 500 having the shift layout (shift pattern) as illustrated in FIG. 4A. That is, the vehicular shift device 500 of the first embodiment of the present invention has a shift layout (shift pattern) that enables operations in the first direction D1 and the second direction D2 to the individual positions (the front position S11 or the front first position S21, the front second position S22, the first position P1 or the second position P2, the rear position S13 or the rear first position S23, and the rear second position S24; see FIG. 17). Therefore, the operating device 100 can be suitably applied to this vehicular shift device 500. This makes it possible for the vehicular shift device 500 to perform shift operations with a sense of moderation. Furthermore, compared with the conventional case, there is no sliding mechanism in a part that generates a sense of moderation with respect to the first direction D1. Therefore, the vehicular shift device 500 enjoys good durability.

Furthermore, a magnetic body and the permanent magnet EM are used together with a simple cam structure (the drive member 7 and the cam member 8). Therefore, there is no need to add new components, and it is possible to reduce size compared with the conventional case. These make it possible to provide the vehicular shift device 500 having a sense of moderation, enjoying good durability, and reduced in size.

Furthermore, when the operating member 1 of the operating device 100 is in a reference position, magnetic bodies all attract each other with a strong force across the permanent magnet EM. Therefore, when the shift knob 50N engaged with the operating member 1 is in the reference position, no rattling is caused in the shift knob 50N even when the vehicle is running, which is all the more preferable for the vehicular shift device 500.

The present invention is not limited to the above-described embodiment, and may be implemented, for example, in the following variations, and these embodiments as well fall within the technical scope of the present invention.

Figure 18A:
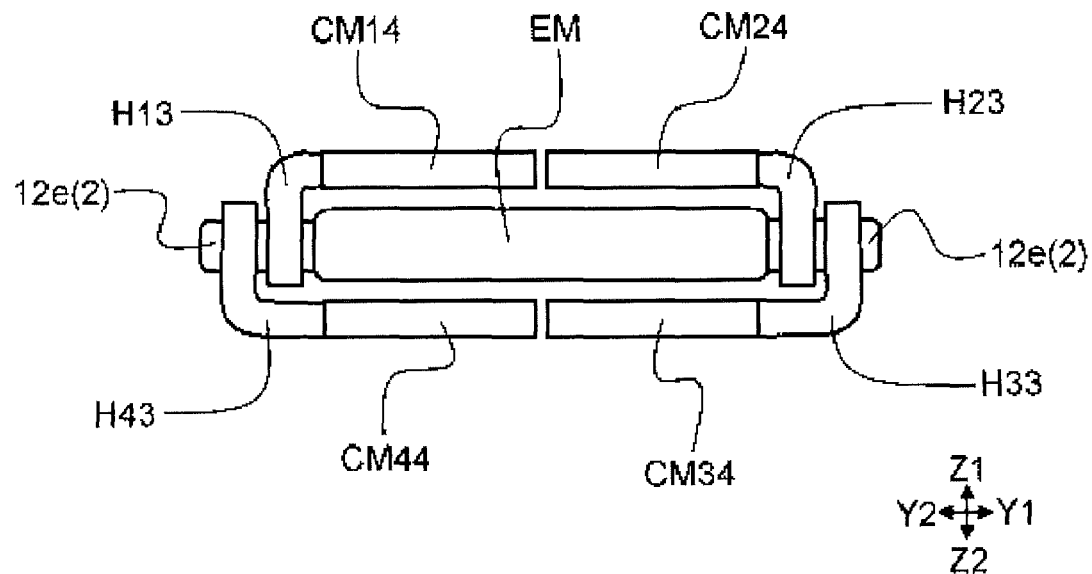
FIGS. 18A and 18B are schematic diagrams illustrating variations of the operating device according to the first embodiment of the present invention, where
Figure 18B:
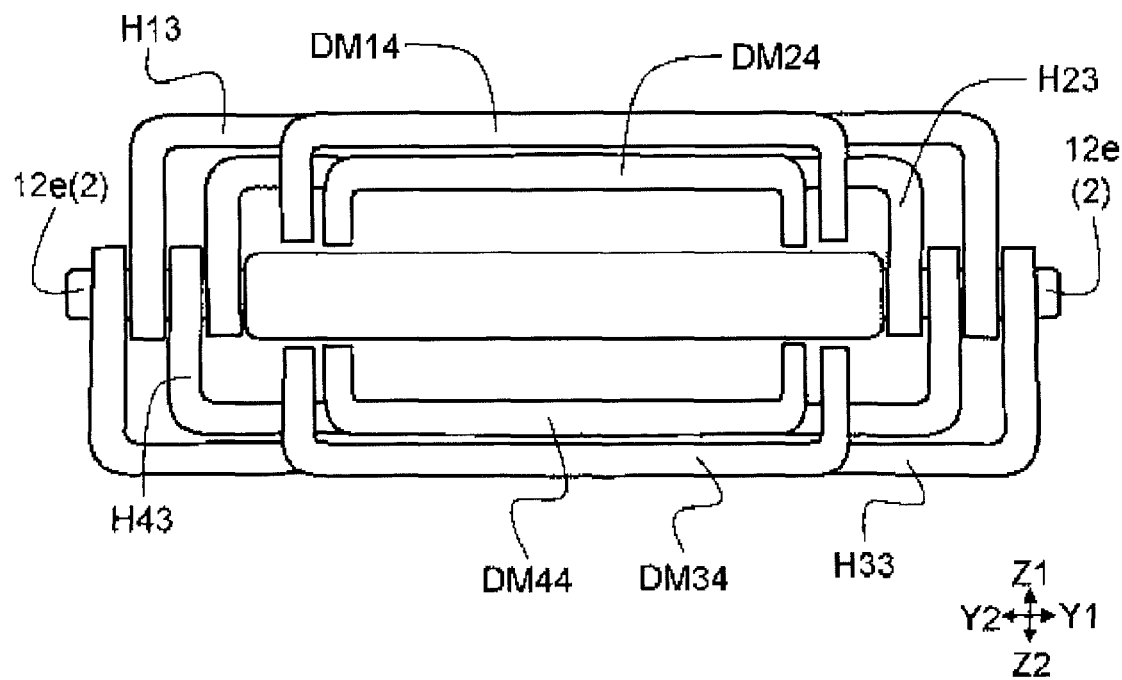
Figure 19:
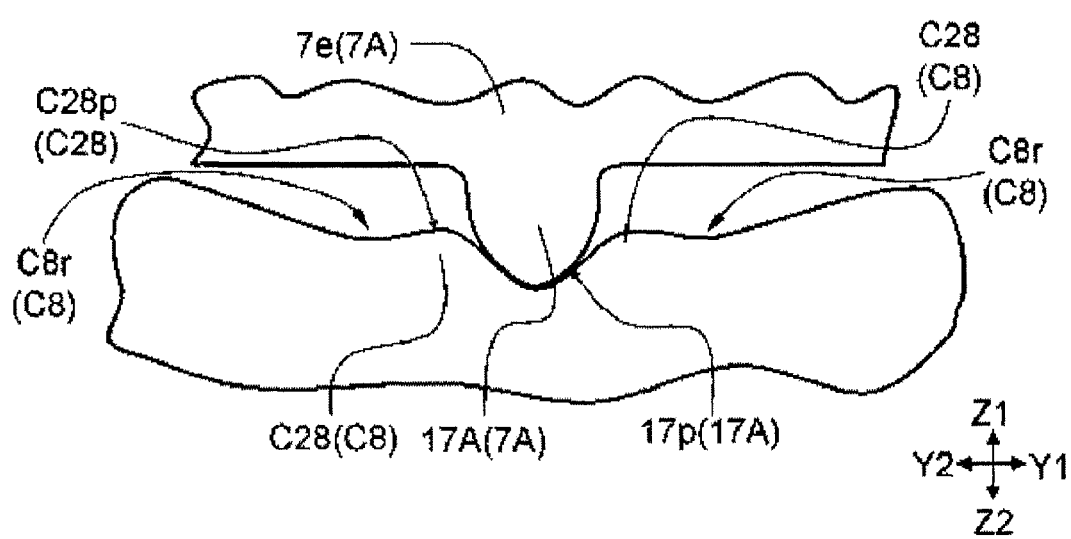
FIG. 19, which is a schematic diagram illustrating Variation 8 of the operating device according to the first embodiment of the present invention, is an enlarged view of part of the drive member and a cam member.
Figure 20:
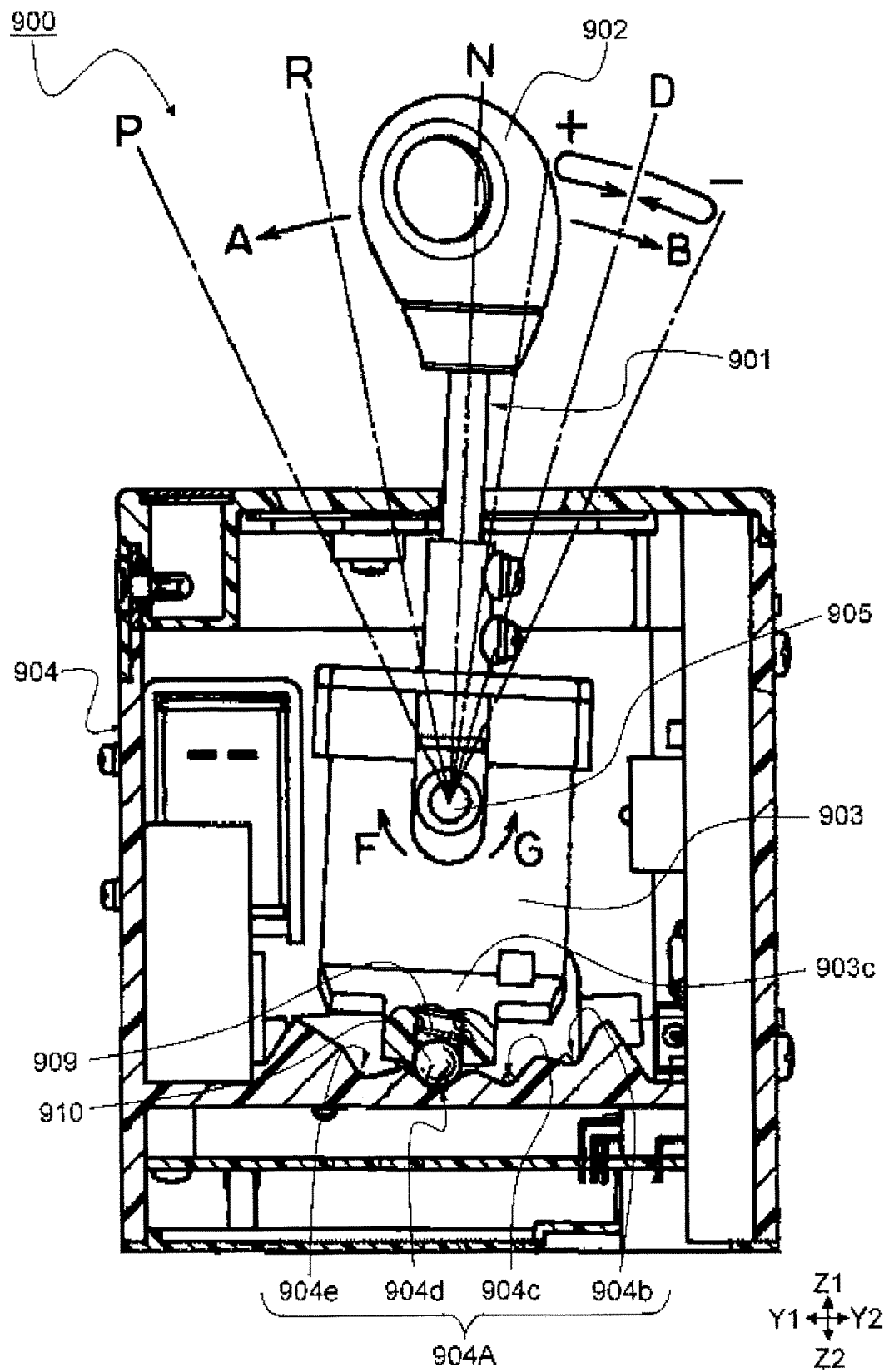
FIG. 20 is an enlarged longitudinal sectional view of an automatic transmission shift operating device of a conventional example with a shift lever in an N range (neutral range).

FIGS. 18A and 18B are schematic diagrams illustrating variations, where FIG. 18A is a side view of Variation 1 and Variation 2 in which the positional relationship between magnetic bodies and the permanent magnet EM is changed, and FIG. 18B is a side view of Variation 3 and Variation 4 in which the shape of magnetic bodies is changed. FIG. 19, which is a schematic diagram illustrating Variation 8, is an enlarged view of part of the drive member 7 (7A) and a cam member C8.

[Variation 1] [Variation 2]

According to the above-described first embodiment, as illustrated in FIG. 8B, the permanent magnet EM, the second magnetic body M24, and the first magnetic body M14 are placed in this order on one side of the permanent magnet EM. The configuration, however, is not limited to this. For example, as illustrated in FIG. 18A, a first magnetic body CM14 and a second magnetic body CM24 may be arranged side by side in a direction along the permanent magnet EM (Variation 1). Likewise, a third magnetic body CM34 and a fourth magnetic body CM44 may be arranged side by side in a direction along the permanent magnet EM (Variation 2).

[Variation 3]

According to the above-described first embodiment, as illustrated in FIGS. 7, 9A and 9B, the first magnetic body M14 and the second magnetic body M24 have a rectangular plate shape. The configuration, however, is not limited to this. For example, as illustrated in FIG. 18B, a first magnetic body DM14 and a second magnetic body DM24 may be bent to face the permanent magnet EM at each end. As a result, a magnetic flux generated by the permanent magnet EM forms a magnetic flux path that passes through the first magnetic body DM14 and the second magnetic body DM24, thus making it possible to increase a force of attraction between the permanent magnet EM and the first magnetic body DM14 and the second magnetic body DM24. As a result, the operator can have a stronger sense of moderation.

[Variation 4]

According to the above-described first embodiment, as illustrated in FIGS. 10A and 10B, the third magnetic body M34 and the fourth magnetic body M44 have a rectangular plate shape. The configuration, however, is not limited to this. For example, as illustrated in FIG. 18B, the same as in Variation 3, a third magnetic body DM34 and a fourth magnetic body DM44 may be bent to face the permanent magnet EM at each end. As a result, it is possible to increase a force of attraction between the permanent magnet EM and the third magnetic body DM34 and the fourth magnetic body DM44, so that the operator can have a stronger sense of moderation.

[Variation 5]

According to the above-described first embodiment, the tilt shaft 12e of the support 2 is suitably formed of a soft magnetic material, but is not limited to this and may be, for example, a metal material such as non-magnetic aluminum or copper alloy or a non-magnetic synthetic resin material.

[Variation 6] [Variation 7]

According to the above-described first embodiment, the drive member 7 is provided on a magnetic body (the second magnetic body M24 or the fourth magnetic body M44). The configuration, however, is not limited to this. For example, the drive member 7 may be provided on another magnetic body (the first magnetic body M14 or the third magnetic body M34) (Variation 6), or the drive member 7 may be provided on at least one of the movable members (the first movable member H13, the second movable member H23, the third movable member H33, and the fourth movable member H43) that pivot with the tilting (tilting in the first direction D1) of the operating member 1 (Variation 7).

[Variation 8] [Variation 9]

According to the above-described first embodiment, as illustrated in FIGS. 16A through 16C, the recess A8r positioned between the two second protrusions 28A and the two recesses A8r positioned one on each side of the two second protrusions 28A have a depressed shape of the same depth, but are not limited to this. For example, as illustrated in FIG. 19, a guide surface C28p may be such that two recesses C8r positioned one on each side of two second protrusions C28 are configured to have such a shallow depressed shape as to be unable to retain the first protrusion 17A (or the first protrusion 17B) at the position (Variation 8). As a result, when the operator's tilting force is removed, the second magnetic body M24 separated from the permanent magnet EM (or the fourth magnetic body M44 separated from the permanent magnet EM) pivots in a direction to be strongly attracted to the permanent magnet EM again because of a force of mutual attraction, so that the first protrusion 17A (or the first protrusion 17B) slides down on a slope of the guide surface C28p without being retained, to be accommodated in a recess C8r positioned between the two second protrusions C28. This makes it possible to automatically return the operating member 1 to a reference position without using an urging member for automatic return with respect to the second direction D2 as well, the same as in the tilting in the first direction D1. Furthermore, on condition that the first protrusion 17A (or the first protrusion 17B) can slide down on a slope of the guide surface C28p without being retained, for example, the two recesses C8r may be flat with no depth (Variation 9).

[Variation 10]

According to the above-described first embodiment, the two second protrusions 28A (or second protrusions 28B) are provided in the guide surface 28p of the cam member 8. The configuration, however, is not limited to this, and three or more second protrusions 28A (or second protrusions 28B) may be provided. This enables tilting to four or more positions in the second direction D2 as well.

[Variation 11]

According to the above-described first embodiment, the third movable member H33, the fourth movable member H43, the third magnetic body M34, the fourth magnetic body M44, the third pressing part 31p, and the fourth pressing part 41p are suitably used. The configuration, however, is not limited to this, and may dispense with these components, for example.

[Variation 12]

According to the above-described first embodiment, two combinations of the cam member 8 and the drive member 7 are suitably used. The configuration, however, is not limited to this, and may be either one of the combinations, for example.

[Variation 13] [Variation 14]

According to the above-described first embodiment, the first movable member H13, the second movable member H23, the third movable member H33, and the fourth movable member H43 suitably pivot about the same tilt shaft 12e serving as a central shaft. The configuration, however, is not limited to this. For example, the third movable member H33 and the fourth movable member H43 may pivot about another shaft serving as a central shaft (Variation 13), or all the movable members may pivot about different tilt shafts serving as a central shaft (Variation 14).

According to an aspect of the present invention, an operating device includes an operating member configured to tilt in response to an operation of an operator, the operating member being configured to be positioned in a plurality of positions of the operating device in response to being tilted from a reference position by the operator, a support supporting the operating member so that the operating member is tiltable, a first movable member and a second movable member configured to tilt in conjunction with the operating member, and a first magnetic body provided on the first movable member, a second magnetic body provided on the second movable member, and a permanent magnet supported by the support. When the operating member is in the reference position, the first magnetic body and the second magnetic body are placed in proximity to each other on one side of the permanent magnet, and the permanent magnet and the first and second magnetic bodies attract each other. When the operating member is tilted in one of first directions from the reference position to be positioned in one or more of the plurality of positions, first, the first magnetic body moves away from the permanent magnet with tilting of the first movable member, and next, the second magnetic body moves away from the permanent magnet with tilting of the second movable member.

According to this, according to the operating device of the present invention, for example, in switching from the reference position to the next position, and from the next position to the position after the next position, first, the strong attraction between the first magnetic body and the permanent magnet changes to weak attraction, and then, the strong attraction between the second magnetic body and the permanent magnet changes to weak attraction. Therefore, in switching to each position in one direction, the operator can have a sense of moderation. As a result, because there is no sliding mechanism in a part that generates a sense of moderation, the durability is improved compared with the conventional case.

Furthermore, according to the operating device, the operating member may include a pillar-shaped operating shaft and a base part spreading in a plane through which a central axis of the operating shaft penetrates, the base part may pivot with tilting of the operating member, the base part may include a first pressing part configured to contact the first movable member and a second pressing part configured to contact the second movable member, and when the operating member is in the reference position, the first pressing part and the second pressing part may be placed opposite the first movable member and the second movable member, respectively, so that a distance between the first movable member and the first pressing part may be smaller than a distance between the second movable member and the second pressing part.

According to this, when the operating member is tilted in one direction from the reference position, the first pressing part presses the opposing first movable member, so that the first magnetic body provided on the first movable member tilts to move away from the permanent magnet, and when the tilting is further continued in the one direction, the second pressing part presses the opposing second movable member, so that the second magnetic body provided on the second movable member tilts to move away from the permanent magnet. As a result, it is possible to facilitate moving the first magnetic body away from the permanent magnet and moving the second magnetic body away from the permanent magnet with respect to each position. Accordingly, it is possible to facilitate manufacture of the operating device with a sense of moderation.

Furthermore, according to the operating device, the second magnetic body may be placed between the first magnetic body and the permanent magnet, and the second movable member may be formed of a non-magnetic material.

According to this, a magnetic flux from the permanent magnet does not penetrate from the second magnetic body through to the second movable member, so that the magnetic flux is not confined by the second magnetic body. Therefore, it is possible to pass much magnetic flux to the first magnetic body at a position more distant from the permanent magnet that is the second magnetic body, so that it is possible to ensure a sufficient force of attraction to the permanent magnet in the first magnetic body.

Furthermore, according to the operating device, the first movable member and the first magnetic body may be a soft magnetic material and may be formed together as one piece.

According to this, it is possible to confine more magnetic flux from the permanent magnet, so that it is possible to increase a force of attraction to the permanent magnet in the first magnetic body. Furthermore, it is possible to reduce the number of components and to reduce the thickness of this part.

Furthermore, according to the operating device, the support may include a tilt shaft that enables the operating member to tilt in the first directions, and the first movable member and the second movable member may pivot about the tilt shaft serving as a central shaft.

According to this, the first movable member and the second movable member are configured to pivot about the same tilt shaft of the support serving as a central shaft. Therefore, it is possible to reduce the number of components and to efficiently use space to reduce size.

Furthermore, according to the operating device, the first magnetic body, the second magnetic body, and the permanent magnet may be placed at such positions that when the operating member is tilted to move the first magnetic body or the second magnetic body away from the permanent magnet, a force of attraction exerted therebetween may not disappear.

According to this, in each position, when the operator's tilting force is removed, the first magnetic body separated from the permanent magnet or the second magnetic body separated from the permanent magnet pivots in a direction to be strongly attracted to the permanent magnet again because of a force of mutual attraction. This makes it possible to automatically return the operating member to the reference position without using an urging member for automatic return.

Furthermore, the operating device may further include a third movable member and a fourth movable member configured to tilt in conjunction with the operating member and a third magnetic body provided on the third movable member and a fourth magnetic body provided on the fourth movable member. When the operating member is in the reference position, the third magnetic body and the fourth magnetic body may be placed in proximity to each other on another side of the permanent magnet, and the permanent magnet and the third and fourth magnetic bodies may attract each other. When the operating member is tilted in the other of the first directions from the reference position to be positioned in one or more of the plurality of positions, first, the third magnetic body may move away from the permanent magnet with tilting of the third movable member, and next, the fourth magnetic body may move away from the permanent magnet with tilting of the fourth movable member.

According to this, for example, in switching from the reference position to the next position, and from the next position to the position after the next position, first, the strong attraction between the third magnetic body and the permanent magnet changes to weak attraction, and then, the strong attraction between the fourth magnetic body and the permanent magnet changes to weak attraction. Therefore, with respect to the other of the first directions as well, in switching to each position, the operator can have a sense of moderation. As a result, with respect to the other of the first directions as well, because there is no sliding mechanism in a part that generates a sense of moderation, the durability is improved compared with the conventional case.

Furthermore, according to the operating device, the support may include a tilt shaft that enables the operating member to tilt in the first directions, the operating member may include a pillar-shaped operating shaft and a base part spreading in a plane through which a central axis of the operating shaft penetrates, the base part may pivot about the tilt shaft serving as a central shaft, the base part may include a first pressing part configured to contact the first movable member, a second pressing part configured to contact the second movable member, a third pressing part configured to contact the third movable member, and a fourth pressing part configured to contact the fourth movable member. When the operating member is in the reference position, the first pressing part, the second pressing part, the third pressing part, and the fourth pressing part may be placed opposite the first movable member, the second movable member, the third movable member, and the fourth movable member, respectively, so that a distance between the first movable member and the first pressing part may be smaller than a distance between the second movable member and the second pressing part and a distance between the third movable member and the third pressing part may be smaller than a distance between the fourth movable member and the fourth pressing part.

According to this, when the operating member is tilted in one direction from the reference position, the first pressing part presses the opposing first movable member, so that the first magnetic body provided on the first movable member tilts to move away from the permanent magnet, and when the tilting is further continued in the one direction, the second pressing part presses the opposing second movable member, so that the second magnetic body provided on the second movable member tilts to move away from the permanent magnet. Furthermore, when the operating member is tilted in the other direction from the reference position, the third pressing part presses the opposing third movable member, so that the third magnetic body provided on the third movable member tilts to move away from the permanent magnet, and when the tilting is further continued in the other direction, the fourth pressing part presses the opposing fourth movable member, so that the fourth magnetic body provided on the fourth movable member tilts to move away from the permanent magnet. As a result, it is possible to facilitate moving the first magnetic body away from the permanent magnet, moving the second magnetic body away from the permanent magnet, moving the third magnetic body away from the permanent magnet, and moving the fourth magnetic body away from the permanent magnet with respect to each position. Accordingly, it is possible to facilitate manufacture of the operating device having a sense of moderation in response to more positions.

Furthermore, according to the operating device, the first movable member, the second movable member, the third movable member, and the fourth movable member may pivot about the tilt shaft serving as a central shaft.

According to this, it is possible to reduce the number of components and to efficiently use space to reduce size.

Furthermore, according to the operating device, the first movable member and the first magnetic body may be formed together as one piece, and the third movable member and the third magnetic body may be famed together as one piece, and the first movable member, the first magnetic body, the third movable member, and the third magnetic body may be a soft magnetic material.

According to this, it is possible to confine more magnetic flux from the permanent magnet, so that it is possible to increase a force of attraction to the permanent magnet in the first magnetic body and a force of attraction to the permanent magnet in the third magnetic body. Furthermore, it is possible to reduce the number of components and to reduce the thickness of this part.

Furthermore, according to the operating device, the tilt shaft may be a soft magnetic material, and the first movable member and the first magnetic body formed together as one piece and the third movable member and the third magnetic body formed together as one piece may be placed to cover the permanent magnet, the second magnetic body, and the fourth magnetic body.

According to this, the first movable member and the first magnetic body, the tilt shaft, and the third movable member and the third magnetic body can form a path for a magnetic flux generated from the permanent magnet. Therefore, it is possible to increase a force of attraction to the permanent magnet in the first magnetic body and the second magnetic body and a force of attraction to the permanent magnet in the third magnetic body and the fourth magnetic body.

Furthermore, according to the operating device, the second magnetic body may be placed between the first magnetic body and the permanent magnet, the fourth magnetic body may be placed between the third magnetic body and the permanent magnet, and the second movable member and the fourth movable member may be formed of a non-magnetic material.

According to this, a magnetic flux from the permanent magnet to the second magnetic body or the fourth magnetic body is prevented from spreading to the second movable member or the fourth movable member, so that a magnetic flux path is formed only in the narrow region of the second magnetic body and the fourth magnetic body. Therefore, the first magnetic body and the third magnetic body, which are at more distant positions from the permanent magnet than are the second magnetic body and the fourth magnetic body, can form a magnetic flux path that allows passage of much magnetic flux from the permanent magnet outside the region of the second magnetic body and the fourth magnetic body. This makes it possible to ensure a sufficient force of attraction to the permanent magnet in the first magnetic body and the third magnetic body.

Furthermore, according to the operating device, the first magnetic body, the second magnetic body, and the permanent magnet may be placed at such positions that when the operating member is tilted in the one of the first directions to move the first magnetic body or the second magnetic body away from the permanent magnet, a force of attraction exerted therebetween may not disappear, and the third magnetic body, the fourth magnetic body, and the permanent magnet may be placed at such positions that when the operating member is tilted in the other of the first directions to move the third magnetic body or the fourth magnetic body away from the permanent magnet, a force of attraction exerted therebetween may not disappear.

According to this, in each position, when the operator's tilting force is removed, the first magnetic body separated from the permanent magnet, the second magnetic body separated from the permanent magnet, the third magnetic body separated from the permanent magnet, or the fourth magnetic body separated from the permanent magnet pivots in a direction to be strongly attracted to the permanent magnet again because of a force of mutual attraction. This makes it possible to automatically return the operating member to the reference position without using an urging member for automatic return.

Furthermore, the operating device may further include a drive member configured to pivot with tilting of the operating member, the drive member being provided on at least one of the first movable member, the second movable member, the first magnetic body, and the second magnetic body and a cam member placed opposite one side of the drive member. A sliding surface including a first protrusion formed into a protruding shape and a guide surface including a second protrusion formed into a protruding shape may be provided on one and the other, respectively, of the drive member and the cam member that are placed opposite each other, and the sliding surface and the guide surface may be placed to be slidable relative to each other. When the operating member is in the reference position, the sliding surface and the guide surface may be in contact with each other because of a force of mutual attraction of at least one combination among a combination of the first magnetic body and the permanent magnet and a combination of the second magnetic body and the permanent magnet. When the operating member is tilted in a second direction crossing the first directions from the reference position to be positioned in one or more of the plurality of positions, the first protrusion of the sliding surface and the second protrusion of the guide surface may move up onto and slide on each other's protruding portion.

According to this, in each position in the second direction, at least one of the first magnetic body and the second magnetic body that move together with the drive member moves following the shape of the protruding portion. Therefore, at least one combination, namely, the permanent magnet and at least one of the first magnetic body and the second magnetic body, are gradually separated and away from each other until the apexes of the first protrusion and the second protrusion abut on each other, and thereafter, come close to each other again. As a result, at this point, strong attraction changes to weak attraction, so that the operator can have a sense of moderation. Thus, because the first magnetic body or the second magnetic body and the permanent magnet are used together with a simple cam structure, there is no need to add new components, and it is possible to reduce size compared with the conventional case.

Furthermore, the operating device may further include a drive member configured to pivot with tilting of the operating member, the drive member being provided on at least one of the first movable member, the second movable member, the third movable member, the fourth movable member, the first magnetic body, the second magnetic body, the third magnetic body, and the fourth magnetic body and a cam member placed opposite one side of the drive member. A sliding surface including a first protrusion formed into a protruding shape and a guide surface including a second protrusion formed into a protruding shape may be provided on one and the other, respectively, of the drive member and the cam member that are placed opposite each other, and the sliding surface and the guide surface may be placed to be slidable relative to each other. When the operating member is in the reference position, the sliding surface and the guide surface may be in contact with each other because of a force of mutual attraction of at least one combination among a combination of the first magnetic body and the permanent magnet, a combination of the second magnetic body and the permanent magnet, a combination of the third magnetic body and the permanent magnet, and a combination of the fourth magnetic body and the permanent magnet. When the operating member is tilted in a second direction crossing the first directions from the reference position to be positioned in one or more of the plurality of positions, the first protrusion of the sliding surface and the second protrusion of the guide surface may move up onto and slide on each other's protruding portion.

According to this, in each position in the second direction, at least one of the first magnetic body, the second magnetic body, the third magnetic body, and the fourth magnetic body that move together with the drive member moves following the shape of the protruding portion. Therefore, at least one combination, namely, the permanent magnet and at least one of the first magnetic body, the second magnetic body, the third magnetic body, and the fourth magnetic body, are gradually separated and away from each other until the apexes of the first protrusion and the second protrusion abut on each other, and thereafter, come close to each other again. As a result, at this point, strong attraction changes to weak attraction, so that the operator can have a sense of moderation. Thus, because the first magnetic body, the second magnetic body, the third magnetic body, or the fourth magnetic body and the permanent magnet are used together with a simple cam structure, there is no need to add new components, and it is possible to reduce size compared with the conventional case.

According to an aspect of the present invention, a vehicular shift device includes the operating device as set forth above, a control part configured to transmit a signal to a vehicle-side device in response to a signal from the operating device, a shift knob engaged with the operating member of the operating device and configured to be gripped by the operator, and a position detecting part configured to detect the plurality of positions in which the operating member is to be positioned.

According to this, the operating device operable to each position can be suitably applied to the shift layout (shift pattern) of the vehicular shift device. This makes it possible to perform a shift operation with a sense of moderation. Furthermore, with respect to the first directions, because there is no sliding mechanism in a part that generates a sense of moderation, the durability is improved compared with the conventional case. Furthermore, a pair of movable-side magnetic bodies is used together with a simple cam structure, there is no need to add new components, and it is possible to reduce size compared with the conventional case. These make it possible to provide the vehicular shift device having a sense of moderation, enjoying good durability, and reduced in size.

According to an operating device of an embodiment of the present invention, for example, in switching from the reference position to the next position, and from the next position to the position after the next position, first, the strong attraction between the first magnetic body and the permanent magnet changes to weak attraction, and then, the strong attraction between the second magnetic body and the permanent magnet changes to weak attraction. Therefore, in switching to each position in one direction, the operator can have a sense of moderation. As a result, because there is no sliding mechanism in a part that generates a sense of moderation, the durability is improved compared with the conventional case.

Furthermore, according to a vehicular shift device of an embodiment of the present invention, the operating device operable to each position can be suitably applied to the shift layout (shift pattern) of the vehicular shift device. This makes it possible to perform a shift operation with a sense of moderation. Furthermore, with respect to the first directions, because there is no sliding mechanism in a part that generates a sense of moderation, the durability is improved compared with the conventional case. Furthermore, a pair of movable-side magnetic bodies is used together with a simple cam structure, there is no need to add new components, and it is possible to reduce size compared with the conventional case. These make it possible to provide the vehicular shift device having a sense of moderation, enjoying good durability, and reduced in size.

The present invention is not limited to the specifically disclosed embodiments, and variations and modifications may be made without departing from the scope of the present invention.

What is claimed is:

1. An operating device comprising:
   an operating member configured to be positioned in a plurality of positions of the operating device in response to being tilted from a reference position by an operator;
   a support supporting the operating member so that the operating member is tiltable;
   a first movable member and a second movable member configured to tilt in conjunction with the operating member; and
   a first magnetic body provided on the first movable member, a second magnetic body provided on the second movable member, and a permanent magnet supported by the support,
   wherein, when the operating member is in the reference position, the first magnetic body and the second magnetic body are placed on one side of the permanent magnet, and the permanent magnet and the first and second magnetic bodies attract each other, and
   wherein, when the operating member is tilted in a first direction from the reference position to be positioned in one or more of the plurality of positions, first, the first magnetic body moves away from the permanent magnet with tilting of the first movable member, and next, the second magnetic body moves away from the permanent magnet with tilting of the second movable member.

2. The operating device as claimed in claim 1, wherein the operating member includes a pillar-shaped operating shaft and a base pan spreading in a plane through which a central axis of the operating shaft penetrates,
   the base part pivots with tilting of the operating member,
   the base part includes a first pressing part configured to contact the first movable member and a second pressing part configured to contact the second movable member, and
   when the operating member is in the reference position, the first pressing part and the second pressing part are placed opposite the first movable member and the second movable member, respectively, so that a distance between the first movable member and the first pressing part is smaller than a distance between the second movable member and the second pressing part.

3. The operating device as claimed in claim 1, wherein the second magnetic body is placed between the first magnetic body and the permanent magnet, and
   the second movable member is formed of a nonmagnetic material.

4. The operating device as claimed in claim 1, wherein the first movable member and the first magnetic body are a soft magnetic material and are formed together as one piece.

5. The operating device as claimed in claim 1, wherein the support includes a tilt shaft that enables the operating member to tilt in the first direction, and
   the first movable member and the second movable member pivot about the tilt shaft serving as a central shaft.

6. The operating device as claimed in claim 1, wherein the first magnetic body, the second magnetic body, and the permanent magnet are placed at such positions that when the operating member is tilted to move the first magnetic body or the second magnetic body away from the permanent magnet, a force of attraction exerted therebetween is maintained.

7. The operating device as claimed in claim 1, further comprising:
a third movable member and a fourth movable member configured to tilt in conjunction with the operating member; and
a third magnetic body provided on the third movable member and a fourth magnetic body provided on the fourth movable member,
wherein when the operating member is in the reference position the third magnetic body and the fourth magnetic body are placed on another side of the permanent magnet, and the permanent magnet and the third and fourth magnetic bodies attract each other, and
wherein, when the operating member is tilted in a second direction opposite to the first direction from the reference position to be positioned in one or more of the plurality of positions, first, the third magnetic body moves away from the permanent magnet with tilting of the third movable member, and next, the fourth magnetic body moves away from the permanent magnet with tilting of the fourth movable member.

8. The operating device as claimed in claim 7, wherein the support includes a tilt shaft that enables the operating member to tilt in the first direction,
the operating member includes a pillar-shaped operating shaft and a base part spreading in a plane through which a central axis of the operating shaft penetrates,
the base part pivots about the tilt shaft serving as a central shaft,
the base part includes a first pressing part configured to contact the first movable member, a second pressing part configured to contact the second movable member, a third pressing part configured to contact the third movable member, and a fourth pressing part configured to contact the fourth movable member, and
when the operating member is in the reference position, the first pressing part, the second pressing part, the third pressing part, and the fourth pressing part are placed opposite the first movable member, the second movable member, the third movable member, and the fourth movable member, respectively, so that a distance between the first movable member and the first pressing part is smaller than a distance between the second movable member and the second pressing part and a distance between the third movable member and the third pressing part is smaller than a distance between the fourth movable member and the fourth pressing part.

9. The operating device as claimed in claim 8, wherein the first movable member, the second movable member, the third movable member, and the fourth movable member pivot about the tilt shaft serving as a central shaft.

10. The operating device as claimed in claim 8, wherein the first movable member and the first magnetic body are formed together as one piece, and the third movable member and the third magnetic body are formed together as one piece, and
the first movable member, the first magnetic body, the third, movable member, and the third magnetic body are a soft magnetic material.

11. The operating, device as claimed in claim 10, wherein the tilt shaft is formed of a soft magnetic material, and
the first movable member and the first magnetic body are formed together as one piece, the third movable member and the third magnetic body are formed together as one piece, and the first movable member, the first magnetic body, the third movable member, and the third magnetic body are placed to cover the permanent magnet, the second magnetic body, and the fourth magnetic body.

12. The operating device as claimed in claim 7, wherein the second magnetic body is placed between the first magnetic body and the permanent magnet,
the fourth magnetic body is placed between the third magnetic body and the permanent magnet, and
the second movable member and the fourth movable member are formed of a non-magnetic material.

13. The operating device as claimed in claim 7, wherein the first magnetic body, the second magnetic body, and the permanent magnet are placed at such positions that when the operating member is tilted in the first direction to move the first magnetic body or the second magnetic body away from the permanent magnet, a force of attraction exerted therebetween is maintained, and
the third magnetic body, the fourth magnetic body, and the permanent magnet are placed at such positions that when the operating member is tilted in the second direction to move the third magnetic body or the fourth magnetic body away from the permanent magnet, a force of attraction exerted therebetween is maintained.

14. The operating device as claimed in claim 7, further comprising:
a drive member configured to pivot with tilting of the operating member, the drive member being provided on at least one of the first movable member, the second movable member, the third movable member, the fourth movable member, the first magnetic body, the second magnetic body, the third magnetic body, and the fourth magnetic body; and
a cam member placed opposite one side of the drive member,
wherein a sliding surface including a first protrusion formed into a protruding shape and a guide surface including a second protrusion formed into a protruding shape are provided on one and the other, respectively, of the drive member and the cam member that are placed opposite each other, and the sliding surface and the guide surface are placed to be slidable relative to each other,
wherein, when the operating member is in the reference position, the sliding surface and the guide surface are in contact with each other because of a force of mutual, attraction of at least one combination among a combination of the first magnetic body and the permanent magnet, a combination of the second magnetic body and the permanent magnet, a combination of the third magnetic body and the permanent magnet, and a combination of the fourth magnetic body and the permanent magnet, and
wherein, when the operating member is tilted in a third direction crossing the first and second directions from the reference position to be positioned in one or more of the plurality of positions, the first protrusion of the sliding surface and the second protrusion of the guide surface move up onto and slide on the protruding portion of each respective surface.

15. The operating device as claimed in claim 1, further comprising:
- a drive member configured to pivot with tilting of the operating member, the drive member being provided on at least one of the first movable member, the second movable member, the first magnetic body, and the second magnetic body; and
- a cam member placed opposite one side of the drive member,
- wherein a sliding surface including a first protrusion formed into a protruding shape and a guide surface including a second protrusion formed into a protruding shape are provided on one and the other, respectively, of the drive member and the cam member that are placed opposite each other, and the sliding surface and the guide surface are placed to be slidable relative to each other,
- wherein, when the operating member is in the reference position, the sliding surface and the guide surface are in contact with each other because of a force of mutual attraction of at least one combination among a combination of the first magnetic body and the permanent magnet and a combination of the second magnetic body and the permanent magnet, and
- wherein, when the operating member is tilted in a second direction crossing the first direction from the reference position to be positioned in one or more of the plurality of positions, the first protrusion of the sliding surface and the second protrusion of the guide surface move up onto and slide on the protruding portion of each respective surface.

16. A vehicular shift device comprising:
the operating device as set forth in claim 1;
a control part configured to transmit a signal to a vehicle-side device in response to a signal from the operating device;
a shift knob engaged with the operating member of the operating device and configured to be gripped by the operator; and
a position detecting part configured to detect the plurality of positions in which the operating member is to be positioned.

* * * * *